(12) United States Patent  (10) Patent No.: US 8,702,888 B2
Hanson et al.  (45) Date of Patent: Apr. 22, 2014

(54) UNITIZED COMPOSITE FABRICS WITH CROSS MACHINE WAVE-LIKE SHAPING AND METHODS FOR MAKING SAME

(75) Inventors: James P. Hanson, Lawton, MI (US); Larry L. Pio, Portage, MI (US)

(73) Assignee: Marketing Technology Service, Inc., Kalamazoo, MI (US)

( * ) Notice: Subject to any disclaimer, the term of this patent is extended or adjusted under 35 U.S.C. 154(b) by 56 days.

(21) Appl. No.: 13/333,451

(22) Filed: Dec. 21, 2011

(65) Prior Publication Data

US 2012/0094085 A1  Apr. 19, 2012

Related U.S. Application Data

(60) Continuation of application No. 12/477,522, filed on Jun. 3, 2009, now abandoned, which is a division of application No. 11/811,978, filed on Jun. 13, 2007, now Pat. No. 7,959,751.

(60) Provisional application No. 60/813,664, filed on Jun. 14, 2006.

(51) Int. Cl.
*B32B 3/28* (2006.01)
*B32B 5/26* (2006.01)
*B29C 53/24* (2006.01)

(52) U.S. Cl.
CPC ... *B32B 3/28* (2013.01); *B32B 5/26* (2013.01); *B32B 2250/03* (2013.01); *B32B 2250/20* (2013.01); *B29C 53/24* (2013.01)
USPC .......................... 156/181; 156/206; 156/308.2

(58) Field of Classification Search
CPC ............ B32B 3/28; B32B 5/022; B32B 5/26; B32B 37/24; B32B 2250/03; B32B 2250/04; B32B 2250/05; B32B 2250/20; B29L 2009/001; D04H 1/4374; D04H 1/559; D04H 11/04; D04H 13/002; D04H 13/007; B29C 53/24; B29C 53/28; B29C 66/7294; A61F 13/53436; A61F 2013/5386
USPC ................ 156/181, 204, 205, 206, 208, 308.2
See application file for complete search history.

(56) References Cited

U.S. PATENT DOCUMENTS 2,409,066 A 10/1946 Powell et al.
2,500,690 A 3/1950 Lannan (Continued)

FOREIGN PATENT DOCUMENTS

GB 2145126 A 3/1985

OTHER PUBLICATIONS

PCT Search Report for International Application No. PCT/US07/71236, date of mailing Sep. 29, 2008. 5 pages.

(Continued)

*Primary Examiner* — Michael Tolin
(74) *Attorney, Agent, or Firm* — Butzel Long

(57) ABSTRACT

Processes for producing a composite material comprising three or more layers, including at least one internal layers that is a roll good element or an in situ produced nonwoven layer includes shaping an assembly of three or more layers into a wave-like form, with at least one of the internal layers being a roll good element or an in situ produced nonwoven layer, and subsequently activating the assembly to cause bonding of the layers and creation of a unitized composite material that, for example, has utility as a filter material.

4 Claims, 30 Drawing Sheets

(56) References Cited

U.S. PATENT DOCUMENTS

| | | |
|---|---|---|
| 2,862,542 A | 12/1958 | Norton |
| 3,012,923 A | 12/1961 | Slayter |
| 3,180,775 A | 4/1965 | Sexsmith |
| 3,214,323 A | 10/1965 | Russell et al. |
| 3,616,031 A | 10/1971 | Fleissner |
| 3,616,035 A | 10/1971 | Baskerville et al. |
| 3,949,128 A | 4/1976 | Ostermeier |
| 4,111,733 A | 9/1978 | Periers |
| 5,484,645 A * | 1/1996 | Lickfield et al. ............... 428/198 |
| 5,491,016 A | 2/1996 | Kaiser et al. |
| 5,558,924 A | 9/1996 | Chien et al. |
| 6,090,469 A | 7/2000 | Wadsworth et al. |
| 6,635,136 B2 | 10/2003 | White et al. |
| 6,867,156 B1 | 3/2005 | White et al. |
| 6,867,256 B1 | 3/2005 | Di Silvestro et al. |
| 6,998,164 B2 | 2/2006 | Neely et al. |
| 7,045,029 B2 | 5/2006 | DeLucia et al. |
| 2003/0022584 A1 | 1/2003 | Latimer et al. |
| 2003/0203695 A1 | 10/2003 | Polanco et al. |
| 2003/0213109 A1 | 11/2003 | Neely et al. |
| 2006/0042049 A1 | 3/2006 | Petersen |

OTHER PUBLICATIONS

Chatterjee and Gupta, Absorbant Technology, Textile Science and Technology, 2002, pp. 359-363 and pp. 461-465.

* cited by examiner

High Frequency

Low Frequency

Machine Direction →

High Amplitude

Low Amplitude

Machine Direction →

Machine Direction →

Machine Direction →

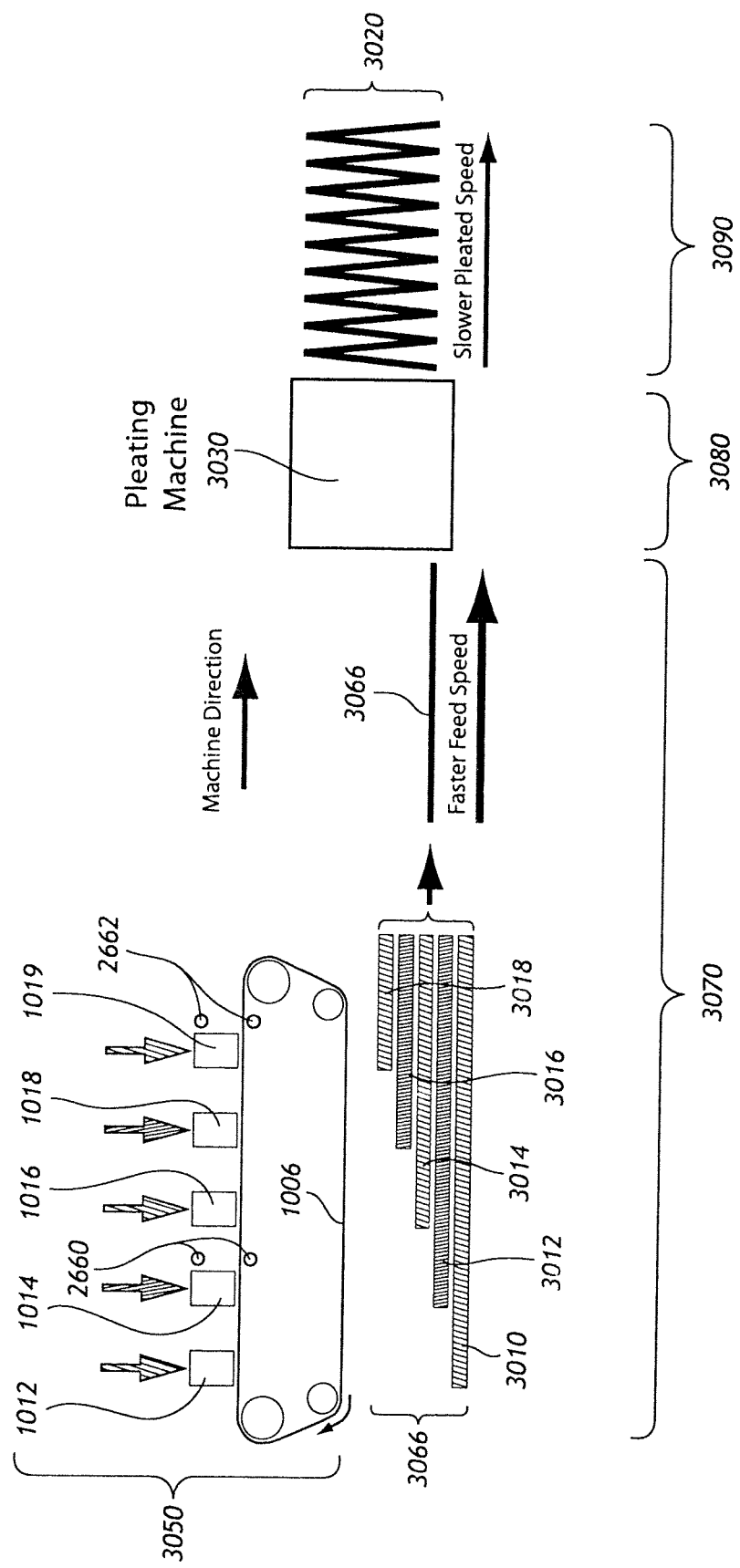

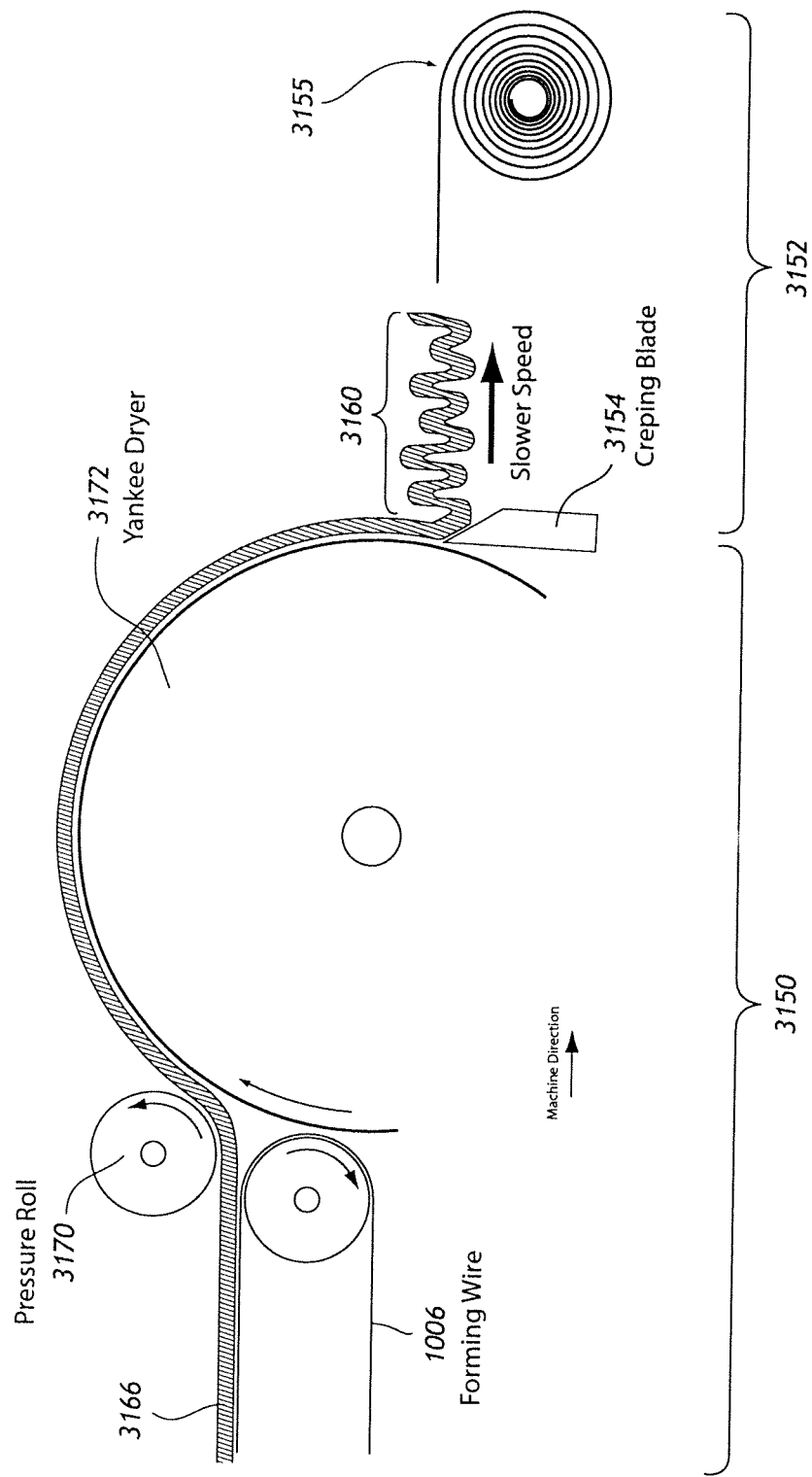
Figure 24A (Creping)

Figure 24B (Micrex™ Microcreping)
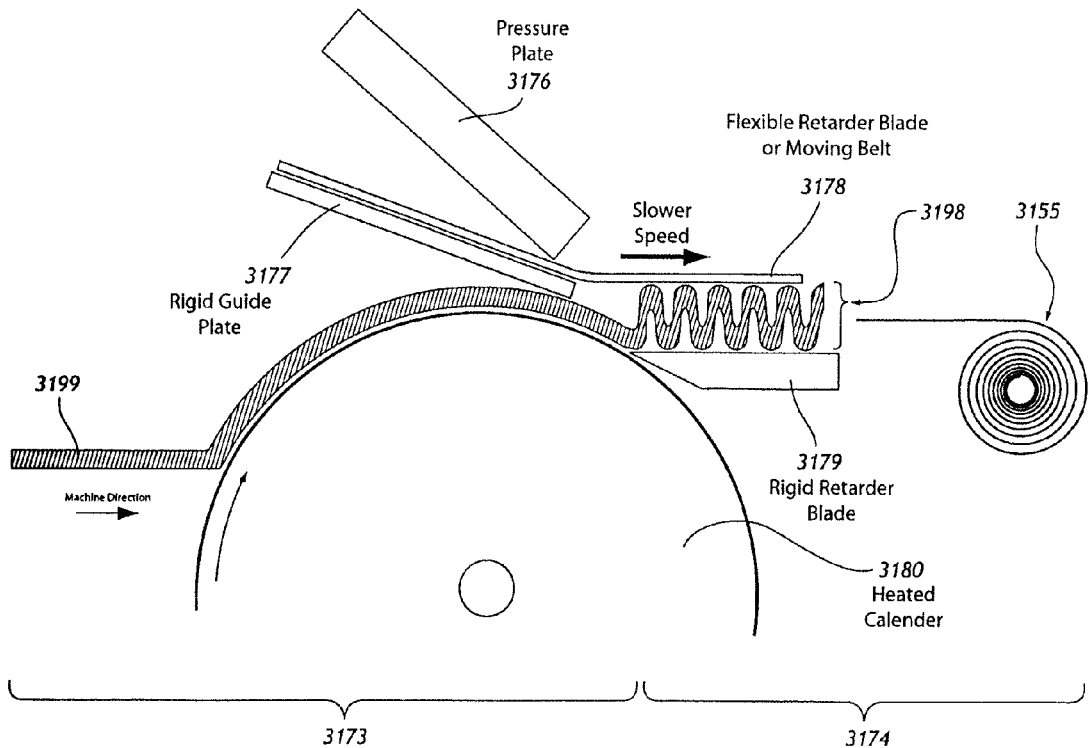
Figure 24C (Micrex™ Microcreping)
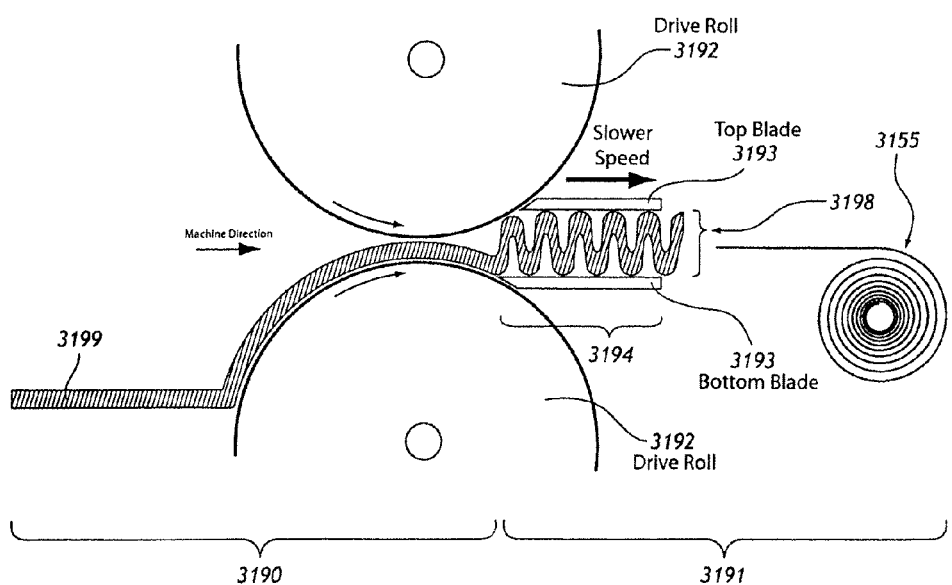

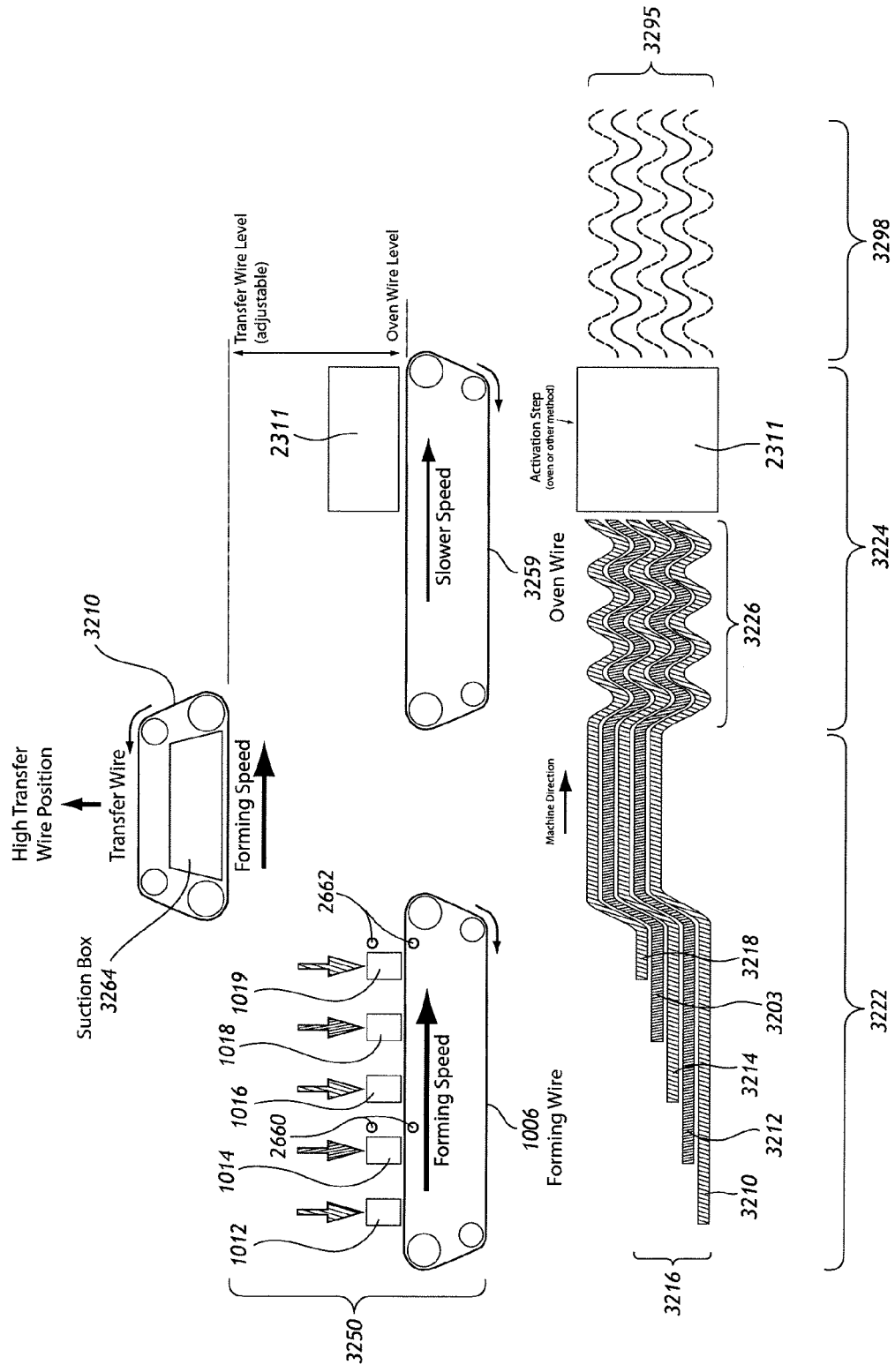

MTS Sample 1 - 060612Q (2X)

MTS Sample 2 - 060612R (4X)

MTS Sample 3 - 060612S (2X)

MTS Sample 4 - 060612F (2X)

MTS Sample 5 - 060612G (2X)

MTS Sample 6 - 060612B (2X)

MTS Sample 7 - 060612H (2X)

MTS Sample 8 - 060612C (2X)

MTS Sample 9 - 060612J (2X)

MTS Sample 10 - 060612D (2X)

MTS Sample 11 - 060612M (2X)

MTS Sample 12 - 060612N (2X)

MTS Sample 13 - 060612E (2X)

MTS Sample 14 - 060612K (2X)

MTS Sample 15 - 060612L (2X)

MTS Sample 16 - 060612A (2X)

MTS Sample 17 - 060612P (2X)

MTS Sample 18 - 0612S2 (2X)

MTS Sample 19 - 051017E  Original (2X)

MTS Sample 19 - 051017E  Stretched to 150% (2X)

MTS Sample 19 - 051017E  Relaxed (2X)

UNITIZED COMPOSITE FABRICS WITH CROSS MACHINE WAVE-LIKE SHAPING AND METHODS FOR MAKING SAME

CROSS-REFERENCE TO RELATED APPLICATIONS

This application is a continuation of U.S. application Ser. No. 12/477,522, filed Jun. 3, 2009, now abandoned, entitled UNITIZED COMPOSITE FABRICS WITH CROSS MACHINE WAVE-LIKE SHAPING AND METHODS FOR MAKING SAME, which is a divisional of U.S. application Ser. No. 11/811,978, filed Jun. 13, 2007, now U.S. Pat. No. 7,959,751, entitled UNITIZED COMPOSITE FABRICS WITH CROSS MACHINE WAVE-LIKE SHAPING AND METHODS FOR MAKING SAME, which claims priority under 35 U.S.C. §119(e) on U.S. Provisional Application No. 60/813,664, filed Jun. 14, 2006, entitled UNITIZED COMPOSITE FABRICS WITH CROSS MACHINE WAVE-LIKE SHAPING AND METHODS FOR MAKING SAME, the entire disclosures of which are incorporated herein by reference.

FIELD OF THE INVENTION

The present invention relates to manufacture of unitized composite fabric structures with cross machine wave-like z-directional shaping which can be stretchable or inelastic and with variable wavelength and amplitude of the wave-like shaping optionally incorporating particles.

BACKGROUND OF THE INVENTION

Nonwovens, films, textiles, papers and paperboard materials as normally manufactured are relatively smooth, flat-surfaced and uniform in density, and are thin compared to their length and width. Known methods for making thicker webs from relatively long fiber assemblies—such as for textiles, carded and spunbonded webs—generally involve the use of a mechanical device to conform a mat or assembly comprised of long fibers into the shape of repeating waves or rely on a controlled gap between stationary plates or moving belts where the mat or assembly is forced to buckle and pile up into a confined area producing a fabric of a different basis weight and optionally of lower or higher density than the equivalent flat material being treated. Bonded webs of long or continuous fiber assemblies, such as those commonly employed in carded webs or self bonded spunbond webs, are normally predominantly aligned in the machine direction and have some internal cohesion in the assemblies even prior to bonding. The fibers are generally longer than the wavelength of the desired wave-like shape.

When thicker structures are desired without increasing the amount of materials used, well-known mechanical shaping treatments, such as corrugation and pleating, are also commonly employed—often in conjunction with lamination—to make three-dimensionally raised arch-like structures from flat roll goods In both long fiber and shorter fiber processing techniques, other known technologies such, as creping, micro-creping, Micrexing and similar such processes, are commonly used to alter structures to produce more bulky and generally softer fabrics. Such treatments, especially when employing relatively short fibers—either during the fabric production process or as an additional post treatment process—may undesirably reduce the stiffness and other desirable properties, such as tensile strength and compression resistance, mostly because of the reduction in the fabric's fiber-to-fiber bond strength and internal cohesion such treatments generally cause.

SUMMARY OF THE INVENTION

In accordance with certain embodiments disclosed herein, processes are provided for producing a composite material having a combination of at least three layers, wherein at least one of the internal layers is a roll good element. Such processes involve shaping an assembly of three of more layers into a wave-like form, wherein at least one internal layer is a roll good element, and then activating the assembly to cause bonding of the layers and creation of a unitized composite material. In accordance with specific embodiments, the roll good element can be a meltblown, a spunbonded, a spunmelted, or a wet formed web.

In accordance with certain other embodiments, processes are provided for producing a composite material comprising three or more layers in which at least one internal layer is an in situ produced nonwoven layer. Such processes involve shaping an assembly of three or more layers into a wave-like form, wherein at least one of the internal layers is an in situ produced nonwoven layer, and then activating the assembly to cause bonding of the layers and creation of a unitized composite material. In specific embodiments, the in situ produced nonwoven is a meltblown, a spunbonded, or a spunmelted web.

In accordance with certain embodiments, a filter is provided which comprises a composite material made by a process comprising shaping an assembly of three or more layers into a wave-like form, with one of the internal layers being either a roll good element or an in situ produced nonwoven layer, and then activating the assembly to cause bonding of the layers and creation of a unitized composite material.

These and other features, advantages and objects of the present invention will be further understood and appreciated by those skilled in the art by reference to the following specification, claims and appended drawings.

BRIEF DESCRIPTION OF THE DRAWINGS

Exemplary embodiments of the invention will be described with reference to the drawings of which:

FIG. 23 shows a method of imparting a raised wave-like shaping to an assembly using pleating techniques.

FIG. 24A shows a method of imparting a raised wave-like shaping to an assembly using creping techniques.

FIGS. 24B-C show variations of a Micrex™ micro-creping process used to impart a wave-like shaping to an assembly.

FIGS. 25A-D show forming of a unitized composite by using loose fiber assemblies which are shaped into a wave-like form using a transfer wire raised in the z direction relative to the oven wire and with the oven wire moving at a lower speed to impart wave-like shaping.

DETAILED DESCRIPTION OF THE INVENTION

Figure 1:
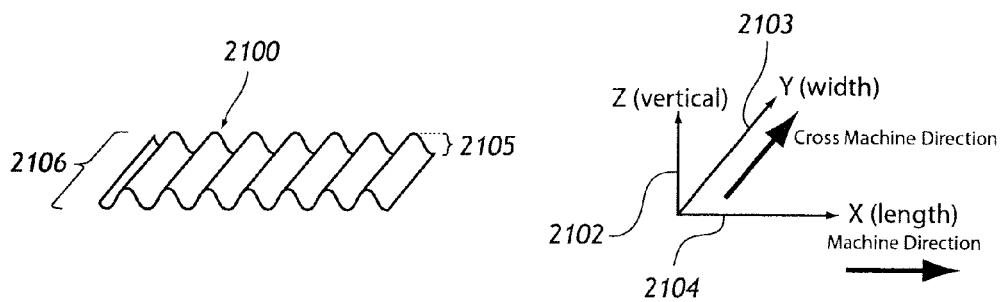
FIG. 1 shows a wave-like structure and the x, y, and z directional conventions used herein.

Although the invention is illustrated and described herein with reference to specific embodiments, the invention is not intended to be limited to the details shown. Rather, various modifications may be made in the details within the scope and range of equivalents of the claims and without departing from the invention. Also, the embodiments selected for illustration in the figures are not shown to scale and are not limited to the proportions shown.

As used herein, the term "nonwoven" means a web having a structure made of individual fibers which are interlaid, but not in an ordered or identifiable manner such as occurs in a woven or knitted web. As defined by INDA, a trade association representing the nonwoven fabrics industry, nonwoven fabrics are generally fabric or web structures bonded together by entangling fibers or filaments (and by perforating films) mechanically, thermally or chemically.

Nonwoven webs are formed from many processes, such as, for example, airlaying, carding, meltblowing, spunbonding, spunmelting (a modified combination of meltblowing and spunbonding), co-forming, wet forming, scrim and netting extrusion, perforated films and other such processes. The term "airlaid" implies that a nonwoven web is formed by a dry air-laying process, which deposits assemblies of loose fibers on a substrate such as a porous collecting wire. The term "short fiber airlaid process" refers to a type of dry air-laying process which was originally developed to process relatively short wood pulp fibers for producing disposable fabrics, like high bulk towels and feminine napkin absorbent media. Typical machines used for an air-laying process are supplied by DanWeb A/S and Neumag Denmark A/S of Denmark.

As used herein, the term "bi-component fiber" or "multi-component fiber" refers to a fiber having multiple components, such as fibers comprising a core composed of one material (such as a polymer) that is encased within a sheath composed of a different material (such as another polymer with a different melting point). Some types of "bi-component" or "multi-component" fibers can be used as binder fibers that can be bound to one another and to other fibers or components to form a unitized structure. For example, in a polymeric fiber, the polymer comprising the sheath often melts at a different, typically lower, temperature than the polymer comprising the core. As a result, such binder fibers provide thermal bonding after appropriate activation, such as by heating in an oven and subsequent cooling, due to melting of the sheath polymer, while retaining the desirable fibrous structure characteristics of the core polymer. As an alternative to using a binder fiber, mono- and multi-component filaments, extrusions, films, scrims, nettings, particles, powders, emulsion polymers and resins in numerous chemistries can also be used to bond fibrous structures, in addition to mechanical bonding methods such as needlepunching and hydro-entangling.

Composite assemblies are optionally made by including other loose fiber assembly techniques, such as carding techniques, or by including direct process nonwovens methods, such as spunbonding, meltblowing, spunmelting, co-forming, extrusions, or with scrims and films or other techniques. These combinations in layered assemblies can be subsequently bonded together to produce a unitized composite structure using an oven or other activation step to cause the layers to adhere to each other becoming a unitized composite after bonding.

As used herein, the term "element" refers to one individual component of a structure, assembly, composite, or lamination, i.e., a layer, fiber, particle, filler, or any other component that can be incorporated (e.g., fusion bonded, adhesively bonded, physically bonded by entanglement or the like, or occluded within) into a unitized structure, assembly, composite, or lamination.

As used herein, the term "assembly" refers to a deposition of loose fiber elements or a layered combination of two or more elements of a structure.

As used herein, the terms "unitized structure" or "unitized composite" refer interchangeably to the structure resulting from bonding assemblies in an oven or other device which causes the layers of an assembly to bond together.

As used herein, the term "wave-like" is used to describe assemblies characterized by a substantially periodic waveform, but not necessarily sinusoidal, perfectly repeating, easily seen, or perfectly parallel, that may be further characterized in terms of wavelength and amplitude, the wavelength being the distance between repeating units of a wave pattern (e.g., measured from one crest to the next crest, or from one trough to the next trough) and the amplitude being the height of the undulations. Alternatively, rather than characterizing the waveform in terms of wavelength, it may be characterized in terms of wavenumber, which is inversely related to wavelength and refers to the number of repeating units of a wave pattern per unit length. The wavenumber is the spacial analogue of frequency. The wave-like form need not be wave-like on both the top and bottom in the finished composite, nor perfectly recurring, i.e., there may be some change in size, shape or other variation of the generally recurring waveforms. Such wave-like form is depicted generally in an idealized form by 2100 in FIG. 1, and typical wave shapings—where one side of the unitized composite is relatively flat after activation—are shown in enlarged photomicrographs in FIGS. 28-48.

As used herein, the term "activation" may be any process, whether with a heated oven, by radiation of electromagnetic energy, or by some other method, which causes bonding to occur between elements within one layer and/or causes bonding to occur between elements in two or more layers when cooled or otherwise removed from activation.

As used herein, the term "recipe" refers to a specific formula of a mixture of various components used in an assembly, including the type and amount of each component.

As used herein, the term "hydro-entangled" refers to treatment of the assembly by high-pressure water jets which rearranges the fibrous elements and causes entanglement of fibers and/or frictional bonding.

As used herein, the term "needle-punched" refers to treatment of the assembly by the use of barbed needles mounted in a needleloom to entangle an assembly by mechanical reorientation of some of the fibers within an assembly.

Exemplary embodiments of the invention will be described with reference to the drawings of which;

FIG. 1 shows a three-dimensional view of a wave-like element 2100. Such a structure is thicker and lower in overall density relative to a flat structure of similar formulation. FIG. 1 also provides a reference to demonstrate the x, y, and z direction conventions that are referred to herein, showing the length 2104 (x or machine direction), width 2103 (y or cross machine direction) and vertical height 2102 (z direction) of a continuous assembly.

FIGS. 2 through 27 follow the conventions of FIG. 1 and are depicted as two-dimensional side views showing the vertical thickness (z-direction) and the length (x-direction) but not showing the cross machine width or y-direction as it is depicted in FIG. 1.

FIGS. 2A-3B show exemplary variations in the z-direction height and the wavenumber of wave-like elements which are easily varied by employing preferred aspects of the present invention.

Figure 2A:
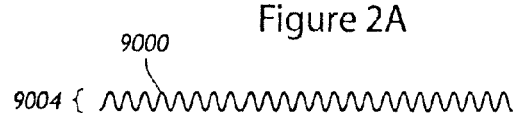
FIG. 2A shows a relatively higher wavenumber wave-like repeating structure in a composite assembly.

FIG. 2A shows an example of a relatively higher wavenumber wave-like repeating element 9000 in a composite assembly 9004.

Figure 2B:
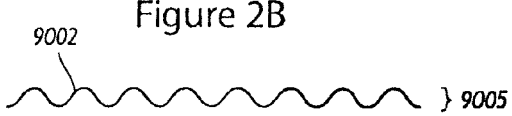
FIG. 2B shows a relatively lower wavenumber wave-like repeating structure in a composite assembly.

FIG. 2B shows an example of a relatively lower wavenumber wave-like repeating element 9002 in a bonded composite assembly 9005.

Figure 3A:
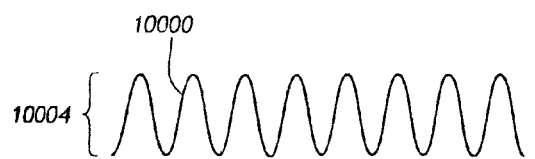
FIG. 3A shows a relatively higher amplitude wave-like repeating structure in a composite assembly.

FIG. 3A shows an example of a relatively higher amplitude wave-like repeating element 10000 in a bonded composite assembly 10004.

Figure 3B:
FIG. 3B shows a relatively lower amplitude wave-like repeating structure in a composite assembly.

FIG. 3B shows an example of a relatively lower amplitude wave-like repeating element 10002 in a bonded composite assembly 10005.

Such assemblies of wave-like elements can be made directly by first assembling multi-layer depositions of elements, at least one of which can be made to bond to other elements in the assembly. A wave-like shaped assembly can also be a single layer.

A desirable attribute of the present invention described herein is the ability to easily alter the shapes, z-directional height, and repeating wavelength of the wave-like elements in a unitized composite without resorting to physical alteration or replacement of machinery components as is normally required, for example, in conventional shaping methods such as corrugation rolls, as used in known corrugation and lamination processes. Altering the wavenumber and amplitude of shaped structures using such conventional corrugating technology would require physically changing the shapes of the corrugation rolls to the desired shaping pattern of the desired waves. The present invention avoids such complications. The entire layered assembly is subjected to a shaping process using an optionally raised transfer device which forms the entire assembly into a three-dimensional wave-like shaping. The shaped assembly then passes through an oven or other activation step, causing the bondable elements to bond to other elements and to remain in the wave-like form when removed from the activation step.

The ability to easily alter the location, recipe and mass amounts of individual elements deposited to make a complex layered assembly is an advantage of the airlaid method of practice of the present invention. An advantage with certain embodiments of the present invention is the ability to accommodate a wide variety of raw materials and forms, such as irregular particles or agglomerates, in blended recipes as long as at least one element can be caused to substantially bond to the other elements in an assembly.

The invention can be accomplished in many basis weights, forms and element combinations as long as at least one element can be caused to bond to the other layers if present. The bonding of individual layers of elements to each other in an activated assembly is generally desirable, but is optional, depending on the selection of materials employed, and reduced bonding—or even the absence of bonding—between one or more layers in a unitized composite is contemplated as well.

While the exemplary methods of depositing elements of the layers used herein are short fiber airlaid forming methods, a wide variety of other assembly methods—and combinations with short fiber airlaid forming methods—are contemplated. Further, the specifics of any particular assembly methodology for depositing and layering the elements of an assembly prior to shaping and activation is not limited to the methods described herein, nor are the mass amounts and recipes of the individual layer elements used in individual layers.

By using an airlaid process for depositing various recipes (i.e., types and mass amounts) of fibrous elements according to aspects of this invention, it is possible to achieve a variety of unitized composite properties, strength characteristics, surface textures, elasticity and densities of the individual layers of an assembly based on selection of materials used, additives, and compression strategies used in depositing the layered assembly prior to shaping and activation. By employing multiple forming heads and separate fiber feeds using the airlaid forming process, maximum flexibility is provided in production of the desirable fabric product design, and rapid changes can easily be made to the formulas of individually deposited elements of an assembly during manufacture.

For example, the composite may have one basis weight of binder fibers in one layer and a different basis weight of fibers in another layer; indeed, the basis weight can be different in any or all of the layers assembled as desired. The mass amounts of materials in each layer, as well as the recipe and characteristics of the materials used, is optionally adjusted over a wide range to accommodate functional demands of the finished unitized composite and other design, cost or processing considerations. Further, unusual composites with dissimilar properties in the individual elements of an assembly can be easily made. Those layers are optionally adjusted individually for desired density using compression rolls located between the airlaid formers, which also affects behavior of the assembly in the shaping process and activation step.

Additionally, more expensive fiber layers can be positioned adjacent to less expensive ingredients concealed in other layers, and properties of the individual layers of an assembly can be selected according to the end-use property requirements, often using a lesser amount of materials to provide equivalent or superior functionality in the finished composite compared to separately made and subsequently combined structures.

Figure 4:
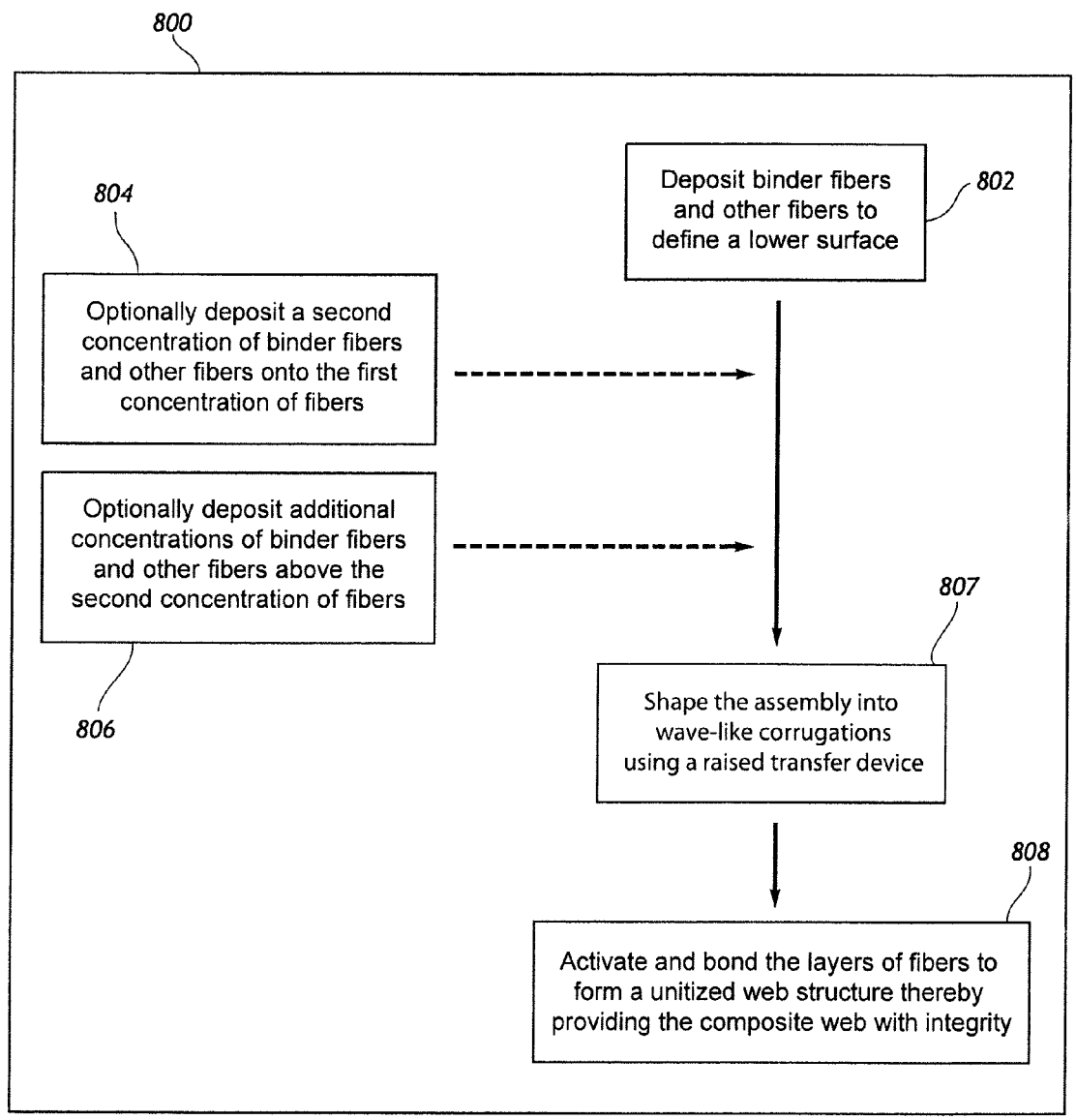
FIG. 4 shows a flow chart of a process for forming a unitized composite according to aspects of this invention.

FIG. 4 is a flow chart 800 of exemplary steps for fabricating a unitized airlaid composite in accordance with one embodiment of the present invention. Block 802 illustrates the step of depositing a first concentration of fibers so as to define a layer. Block 804 illustrates the step of depositing a second concentration onto the first concentration of binder fibers, wherein the second concentration of fibers is layered on top of the first concentration of fibers to form contacting un-bonded, but relatively discrete, layers. Block 806 illustrates the step of depositing an additional concentration(s) of fibers to further construct multiple layers. Block 807 illustrates the additional step of shaping the layer assembly into a wave-like form. Block 808 illustrates the final step of activating and bonding the assemblies of fibers together to form a unitized composite structure.

Practitioners skilled in the art will recognize that the recipes of fiber blends, mass amounts of materials deposited in each layer, and the densities of individual layers deposited will affect the behavior of the individual layers during and following activation. The figures described herein demonstrate exemplary ways in which the density of individual layers can be optionally varied in the deposition process by using compression rolls positioned between the forming heads. Combinations with other potentially desirable materials—such as paper, textile or nonwoven webs, films or similar extruded or roll good systems (including direct process elements made simultaneously during the manufacture of airlaid assemblies)—can be made without departing from the spirit of the inventions. Indeed, such variations are contemplated as being desirable to take advantage of beneficial economics and processing advantages from commercially available roll goods or other assembly methods for elements that offer properties of technical interest.

Referring now to FIGS. 5 through 15, schematic representations are provided for exemplary systems that can be used to form a unitized airlaid composite according to aspects of this invention. Exemplary short fiber airlaid process machinery suitable for practice of the present invention is available for public use at Marketing Technology Service, Inc. of Kalamazoo Mich. USA, or through DanWeb A/S of Aarhus, Denmark and Neumag Denmark A/S of Horstens, Denmark.

Specifically, FIGS. 5 through 15 provide schematic side views of exemplary webs and complimentary web-forming systems in such a way as to show how layers are deposited on top of each other while moving through respective web-forming systems. The layers of the exemplary webs are not depicted to any particular proportion or scale, but are instead shown schematically for purposes of illustration only. Also, because of some mixing and blending of fibers between the layers of a unitized airlaid structure that occurs during the web-forming process, the layers are not perfectly distinct as depicted in the figures.

Generally, each of the web-forming systems illustrated in FIGS. 5 through 15 shows a machine having a conveyor surface 1020 which is a porous wire screen on which the web of the airlaid composite is formed. Fiber-introducing heads are positioned above the wire screen in order to deliver components of the airlaid composite to the screen in a controlled manner. The fiber-introducing heads are configured to introduce the same or different fibers in any combination, as depicted schematically in FIGS. 5 through 15 by cross-hatching. For example, two or more (or all) of the heads can introduce the same fibers or fiber mixture, or all or some of the heads can introduce different fibers or fiber mixtures. Rolls are also provided in order to selectively modify the web as it passes through the forming system. The schematic representation of the resulting web of the unitized airlaid composite (juxtaposed below the machine in each of FIGS. 5 through 15) shows the web portions provided by each of the heads as those portions build to form the web of the unitized airlaid composite along the machine direction (MD). Again, the web portions are integrated in actual airlaid systems as opposed to the distinct zones depicted schematically in FIGS. 5 through 15 for purposes of illustration.

Figure 5:
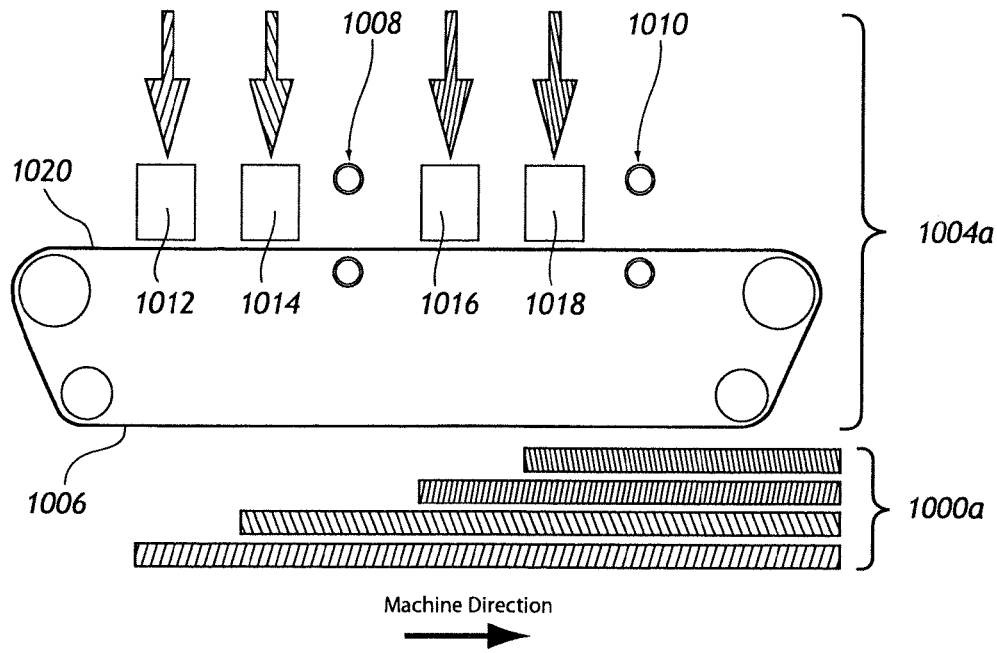
FIGS. 5-15 show airlaid assemblies of loose fiber layers which are optionally compressed.

Referring specifically to FIG. 5, one exemplary system utilizes a machine 1004a to form a web of an airlaid composite 1000a. The machine 1004a includes a conveyor mechanism 1006 that supports a wire screen 1020 on which the components of the airlaid composites are deposited. A pair of upstream rolls 1008 and another pair of downstream rolls 1010 are provided in such a way that the wire screen 1020 passes between each pair of rolls 1008 and 1010. Multiple heads are provided above the wire screen 1020 along the length of the machine 1004a. Illustrated machine 1004a includes four (4) heads, including a first head 1012, a second head 1014, a third head 1016, and a fourth head 1018. First and second heads 1012 and 1014 are positioned upstream from the upstream rolls 1008, and third and fourth heads 1016, 1018 are positioned downstream from upstream rolls 1008 and upstream from downstream rolls 1010. The upstream and downstream sets of rolls 1008 and 1010 are optionally utilized as compression rolls. The gap between the rolls in 1008 and the gap between the rolls in 1010 is adjustable, as will become clear in connection with the description of FIGS. 6 through 15.

Further, skilled practitioners will appreciate that heated compression rolls will produce different results compared to unheated compression rolls, and that variations in the pressure employed in combination with the compression roll temperature will affect results in the following steps, such as shaping the assembly into wave-like shaping. The machine 1004a illustrated in FIG. 5 is a 4-head airlaid machine shown to have heads 1012, 1014, 1016 and 1018 feeding substantially equal amounts of the same fiber composition. Alternatively, one or more of heads 1012, 1014, 1016 and 1018 optionally feed substantially different amounts of fibers or feed substantially different fibers or fiber compositions. As illustrated in FIG. 5, the machine 1004a does not utilize upstream and downstream rolls 1008 and 1010 as compression rolls (i.e., the gaps between the compression rolls of 1008 and of 1010 are maintained so as to eliminate or minimize compression of the web passing between them). Accordingly, the machine 1004a is configured to yield a relatively thick fabric having a relatively low density.

Figure 6:
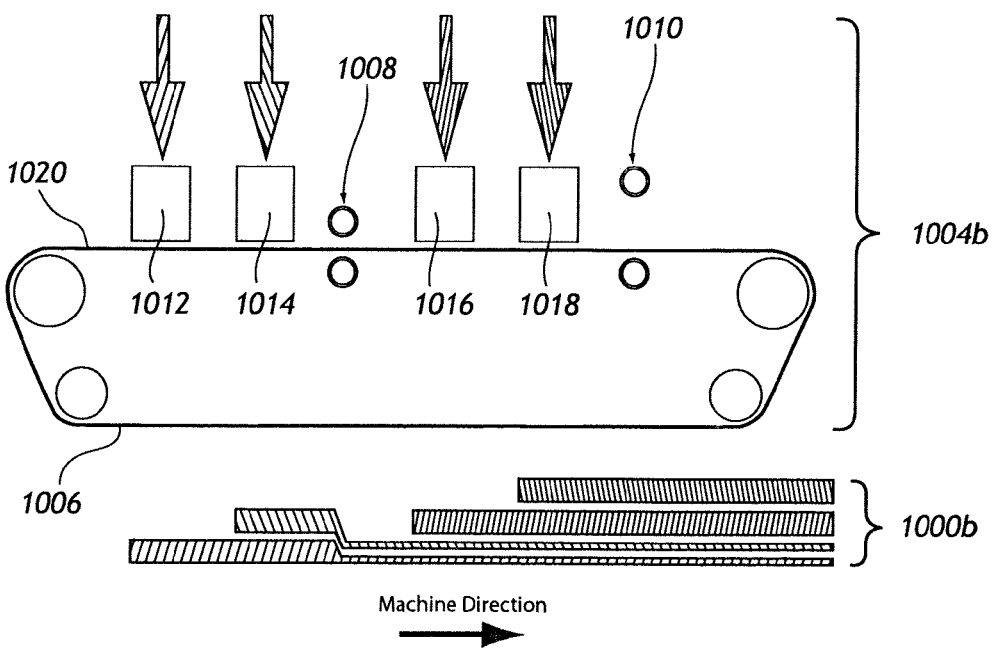

Referring now to FIG. 6, the exemplary system shown includes a machine 1004b used to form a web 1000b. The machine 1004b is configured to utilize the upstream rolls 1008 as compression rolls while the downstream rolls 1010 are not so utilized. Accordingly, the machine 1004b is configured to form a variable density fabric because the zones introduced by first and second heads 1012 and 1014 are compressed by upstream rolls 1008, thereby increasing the density of those zones, while the zones deposited by third and fourth heads 1016 and 1018 are not densified because the downstream rolls 1010 are spaced so as to minimize or eliminate any compression of the zones deposited by those heads 1016 and 1018.

Figure 7:
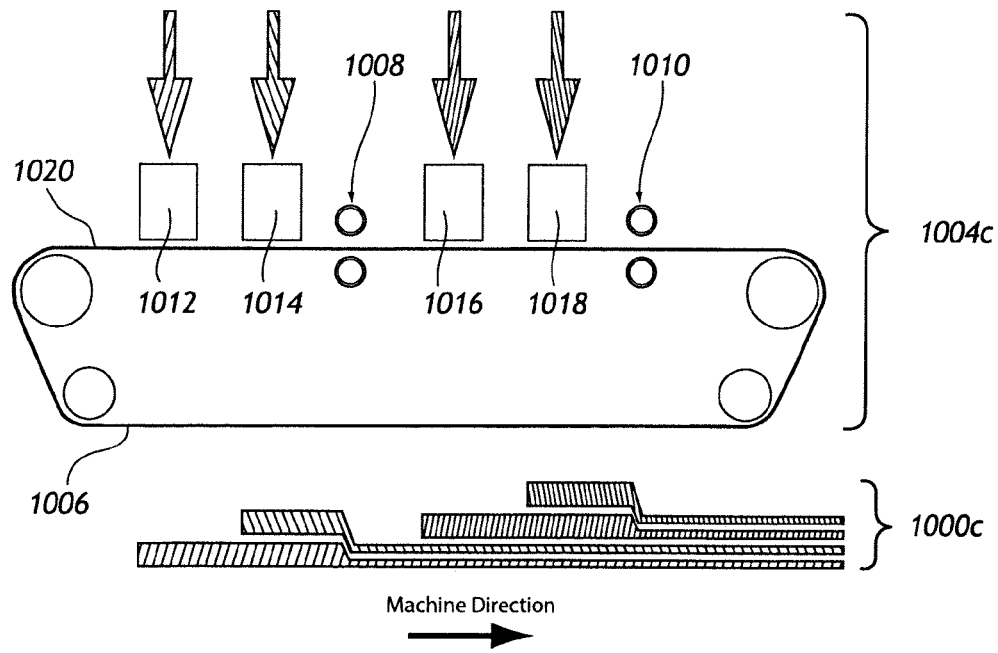

Referring next to FIG. 7, the illustrated system includes a machine 1004c used to form a unitized airlaid web 1000c. In this system, both the upstream rolls 1008 and downstream rolls 1010 are utilized as compression rolls, thereby yielding a thinned web of fabric having a relatively high density.

Figure 8:
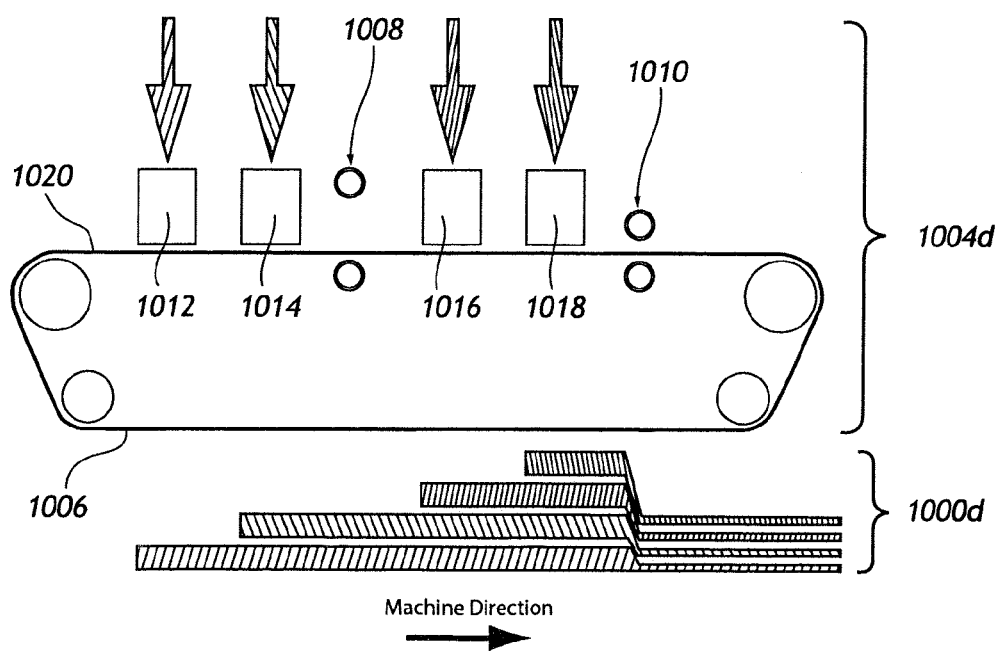

Referring now to FIG. 8, which illustrates a machine 1004d used to form a web 1000d, only the downstream rolls 1010 are utilized as compression rolls (upstream rolls 1008 are not so utilized). Accordingly, machine 1004d provides for an overall compression of the web, thereby yielding a thinned fabric of substantially constant density, similar in respects to the web 1000c formed according to the system illustrated in FIG. 7.

Figure 9:
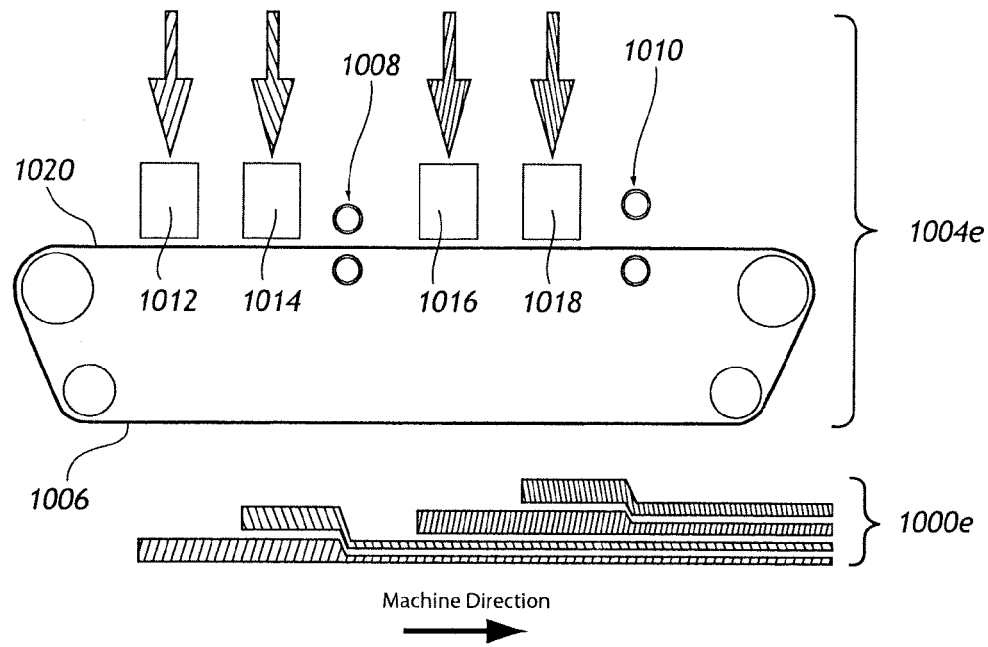

Referring now to FIG. 9, a machine 1004e is used to form a web 1000e. Machine 1004e utilizes both the upstream rolls 1008 and the downstream rolls 1010 as compression rolls but with varying degrees of compression. More specifically, upstream rolls 1008 are utilized as compression rolls while downstream rolls 1010 are provided for partial compression. Accordingly, machine 1004e yields a gradient density web (as illustrated schematically by the relative thicknesses of the zones of the web 1000e), but the web 1000e differs from the web 1000b shown in FIG. 6 and the web 1000c shown in FIG. 7 with respect to the thickness and densities of zones in the web 1000e (e.g., the top two zones of the respective webs are thicker and will typically have a lower density).

Figure 10:
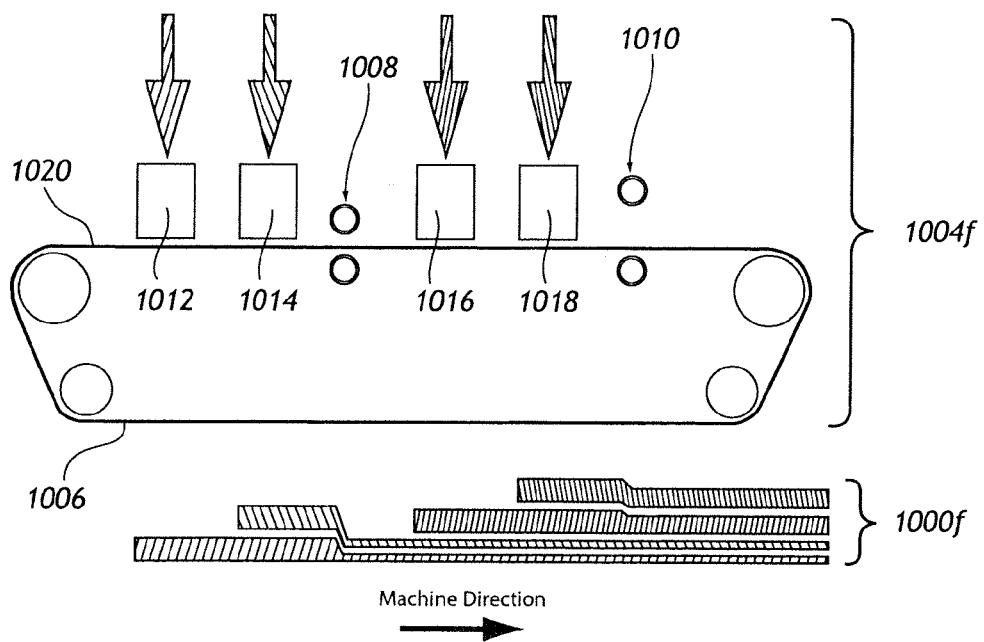

Referring to FIG. 10, a machine 1004f forms a web 1000f that is similar to the web 1000e illustrated in FIG. 9. Web 1000f differs from web 1000e in the degree of compression provided by downstream rolls 1010, thereby yielding thicker zones of material deposited via the third and fourth heads 1016 and 1018.

Figure 11:
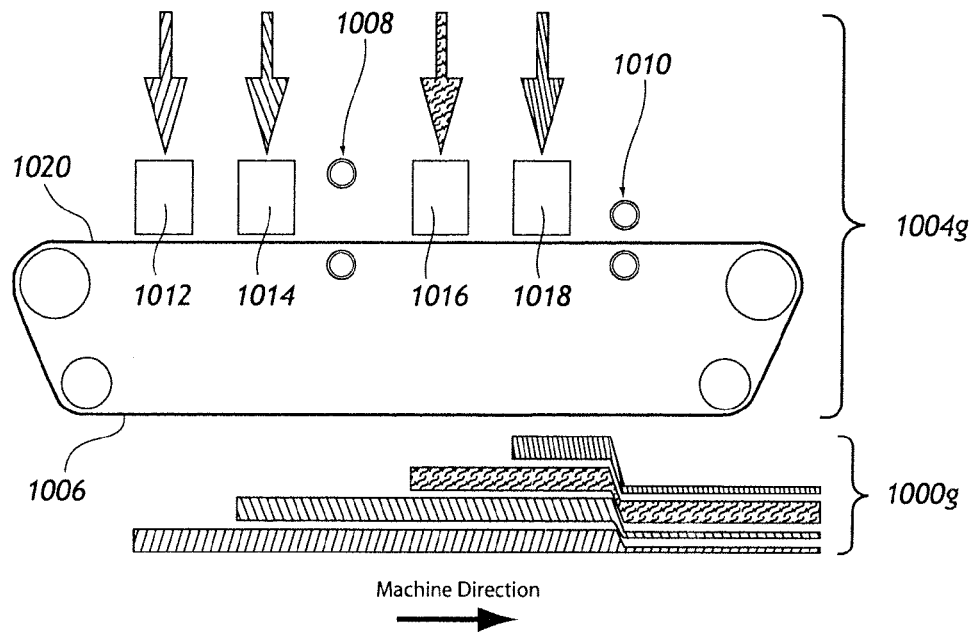

Referring now to FIG. 11, a machine 1004g yields a web 1000g. The system illustrated in FIG. 11 is similar to that illustrated in FIG. 8, except that a resilient fiber is introduced through one of the heads. Specifically, a resilient fiber is introduced to the web via the third head 1016, wherein the fiber introduced via head 1016 differs from that introduced via heads 1012, 1014, and 1018, at least in terms of its resiliency. Because of the resiliency of the fiber introduced through the third head 1016, the zone thus produced tends to "bounce back" to or toward its original shape after passing through downstream rolls 1010, thereby yielding a more bulky and lower density central zone surrounded by substantially thinner zones. Such a zone is optionally provided at any location across the thickness of the web, including top and bottom zones of the web. Skilled practitioners will recognize that the individual elements used in the layers are not required to be loose fiber assemblies, and that many shapes and form factors of materials can be accommodated by the airlaid forming process.

FIGS. 12 through 15 illustrate the assembly of systems that differ from those illustrated in FIGS. 5 through 11 in that one or more separate raw material components are optionally introduced into the assembly process. The separate component is optionally a pre-formed web of material such as a nonwoven. Preferably, the separate component is formed in-situ in combination with the airlaying process to reduce manufacturing costs.

Figure 12:
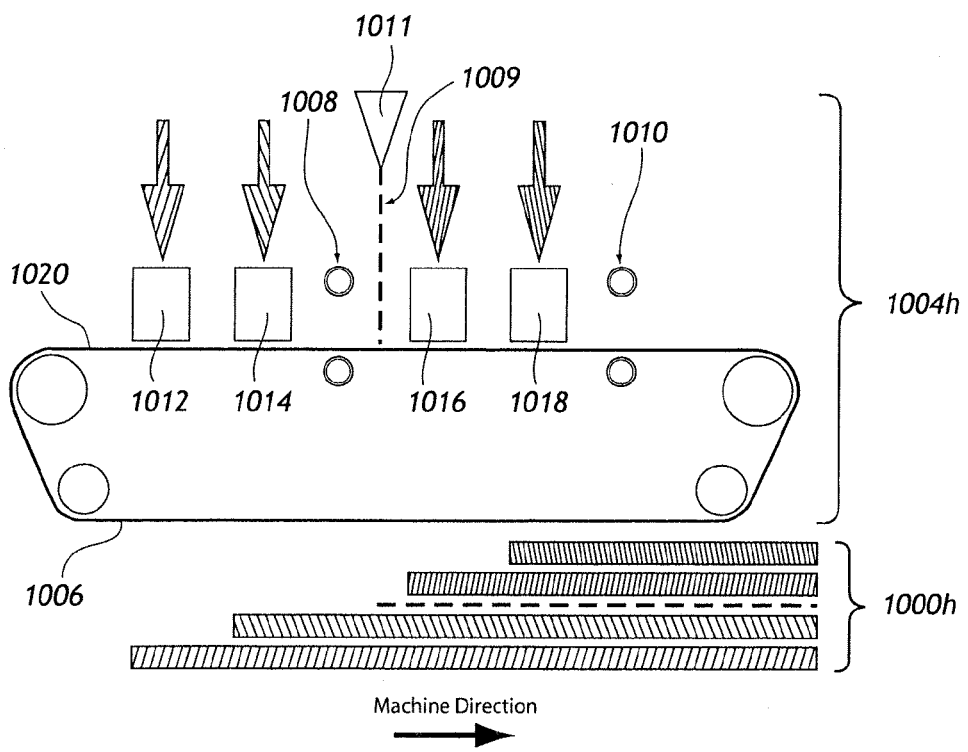

Referring to FIG. 12, a machine 1004h is used to form a web 1000h that includes a web of material between adjacent zones of the web 1000h formed through the second and third heads 1014 and 1016. More specifically, a mechanism supplemental head 1011 is provided in machine 1004h to introduce a material 1009 at a location between the second head 1014 and third head 1016, thereby interposing the web material between the zones of the web 1000h formed by the second head 1014 and third head 1016. Accordingly, the resulting web 1000h is similar to the web 1000a formed by the machine 1004a (FIG. 5), except that an additional web material 1009 has been introduced into the web 1000h between zones of the web 1000h.

Figure 13:
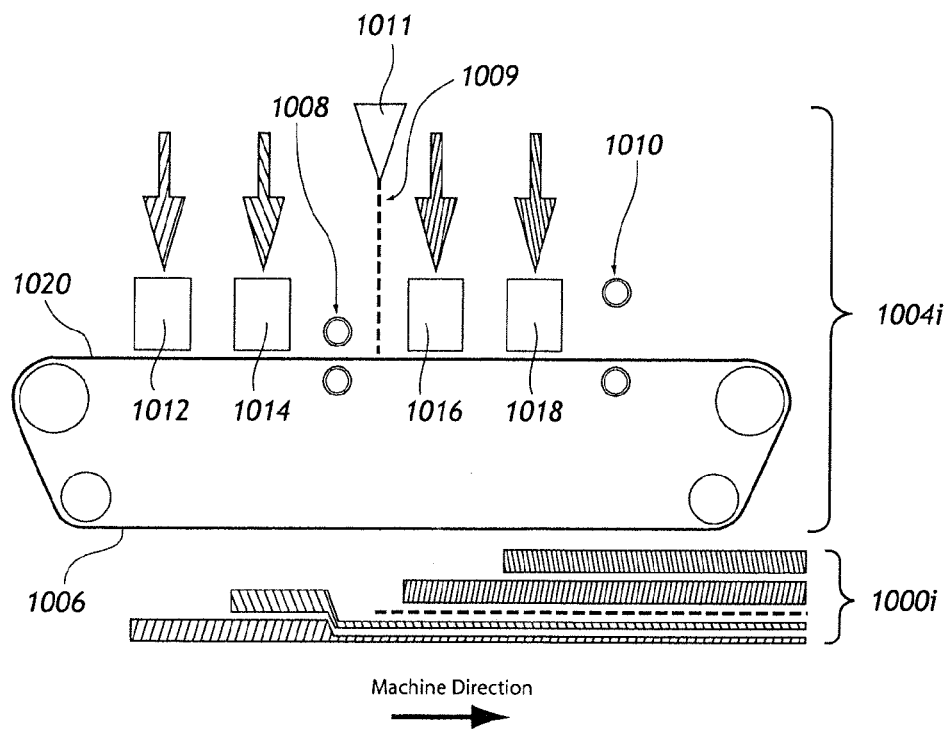

Referring to FIG. 13, a machine 1004i produces a web 1000i. Web 1000i is similar to web 1000b (FIG. 6), in that the upstream rolls 1008 are utilized as compression rolls to compress the first two zones deposited by means of first head 1012 and second head 1014. Web 1000i is also similar to web 1000h (FIG. 12) in that separate web material 1009 is introduced via supplemental head 1011 between the zones deposited by the second and third heads 1014 and 1016.

Figure 14:
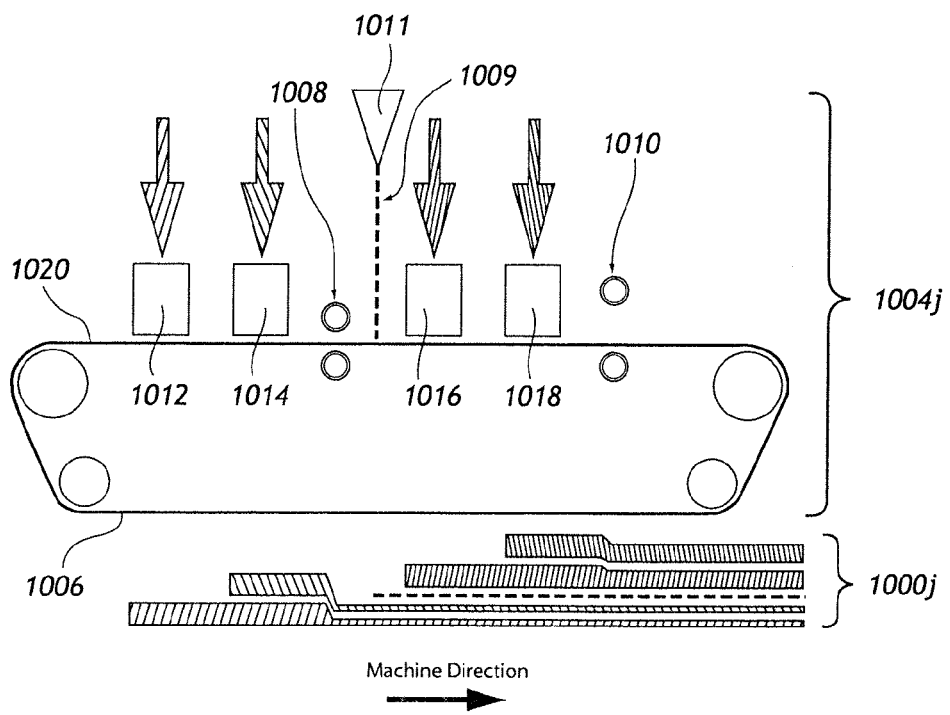

Referring to FIG. 14, a machine 1004j is used to form a web 1000j. Web 1000j is similar to web 1000f (FIG. 10) in terms of compression ratios and similar to web 1000h (FIG. 12) in terms of the introduction of a separate web material 1009 via supplemental head 1011.

Figure 15:
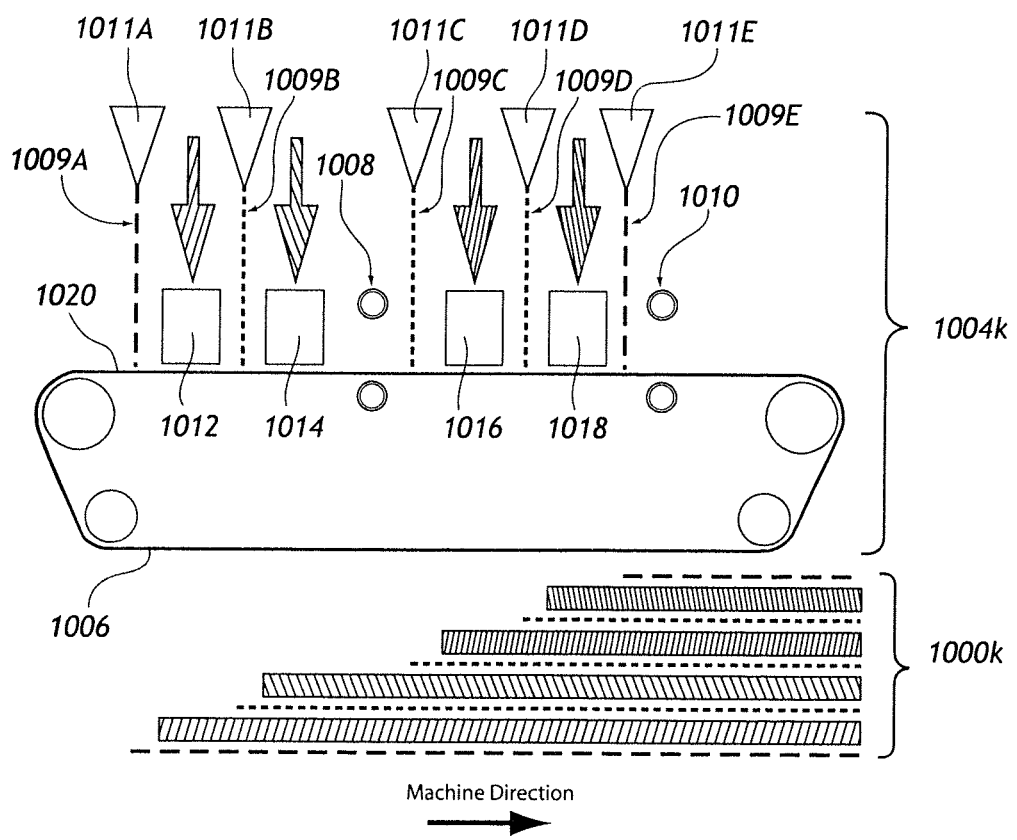

Referring now to FIG. 15, a machine 1004k is used to form a web 1000k. The schematic illustration provided in FIG. 15 demonstrates that multiple components (the same or different components) can be provided via heads 1011A-1011E positioned between the airlaid forming heads. For example, heads can be provided for the introduction of web materials 1009A-1009E (e.g., spunbonded, meltblown or spunmelted materials or films) at one or any combination of locations upstream and downstream of the heads 1012, 1014, 1016 and 1018. In machine 1004k, such supplemental heads 1011A-1011E are provided upstream of first head 1012, between first head 1012 and second head 1014, between second head 1014 and third head 1016, between third head 1016 and fourth head 1018, and downstream from fourth head 1018 and upstream of downstream rolls 1010. Any combination of such supplemental heads can be utilized, and such heads can be used to introduce the same or different components in any combination. Also, although not shown in FIG. 15, the upstream rolls 1008 and downstream rolls 1010 can be utilized in any combination as compression rolls in order to compress selected zones of the resulting web 1000k. It is also contemplated that a fabric is optionally produced by forming a unitized airlaid composite directly onto a roll good substrate, for example by forming a unitized airlaid composite directly onto a porous substrate such as a light weight spunbond web or other suitable substrate.

It is recognized that some materials (e.g., spunbond webs) are ubiquitous and inexpensive, both as separately produced roll goods and as web elements made in-situ during the manufacture of the assemblies incorporated simultaneously with the airlaying process. Accordingly, such materials may be beneficially used, preferably in conjunction with airlaid fibrous materials and optionally with the addition of particulate materials into the unitized composite structures.

FIGS. 16, 17 and 18A-B depict exemplary airlaid unitized composites.

Figure 16:
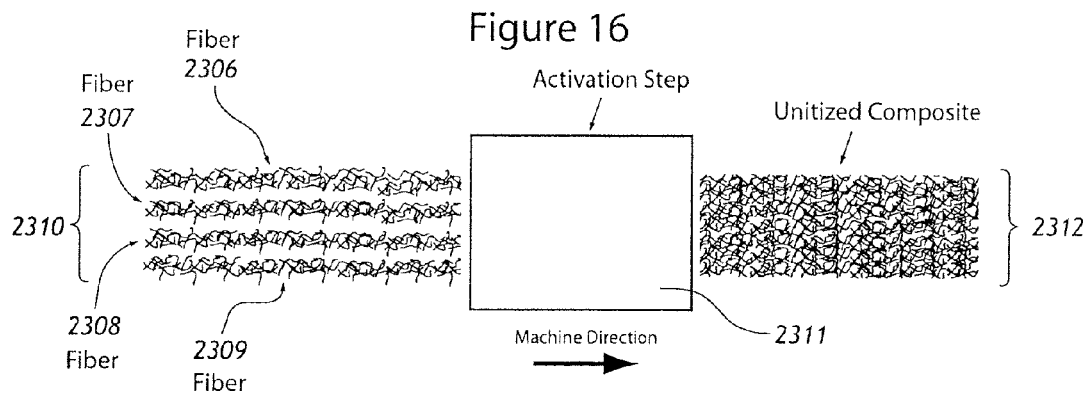
FIG. 16 shows an assembly of loose fiber layers which are then bonded into a unitized composite.

FIG. 16 shows an exemplary assembly of loose fiber layers 2310 assembled on top of each other and then bonded together into a single unitized composite 2312 in an oven or other activation step 2311.

Figure 17:
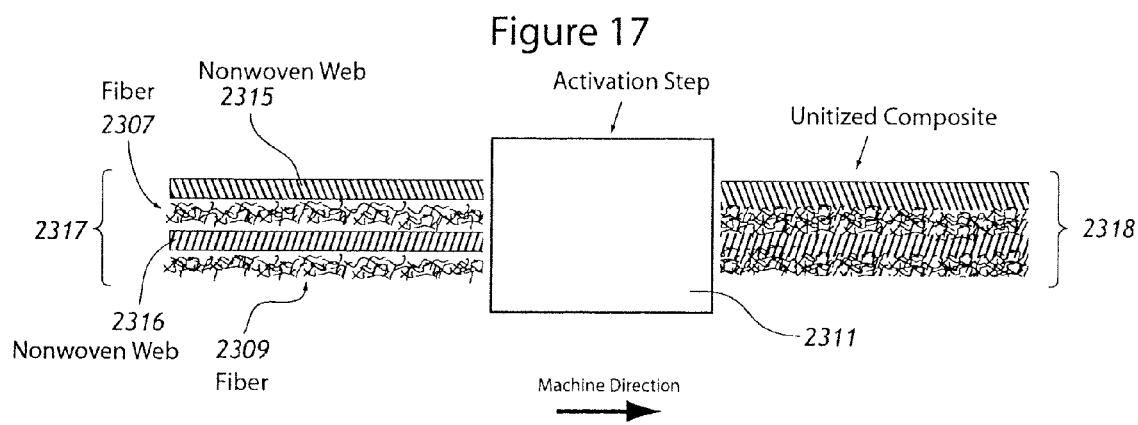
FIG. 17 shows an assembly of loose fiber layers and nonwoven layers which are then bonded into a unitized composite.

FIG. 17 shows an exemplary assembly of loose fiber layers 2307, 2309 and direct process nonwoven layers 2315, 2316 made at the same time and assembled on top of each other, and then bonded together into a single unitized composite 2318 in an oven or other activation step 2311.

Figure 18A:
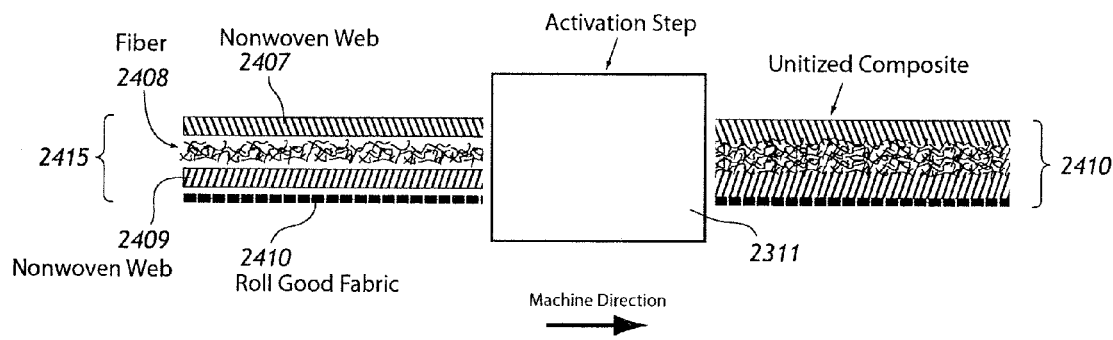
FIGS. 18A and 18B show loose fiber layers, nonwoven process layers, and previously made roll good fabrics which are assembled on top of each other and then bonded into a unitized composite.

FIG. 18A shows an assembly 2415 of loose fiber layer 2408 and nonwoven process layer elements 2407, 2409 all laid down at the same time on a previously made roll good fabric 2410 and subsequently bonded in an oven or other activation step 2311 into a single unitized composite 2410.

Figure 18B:
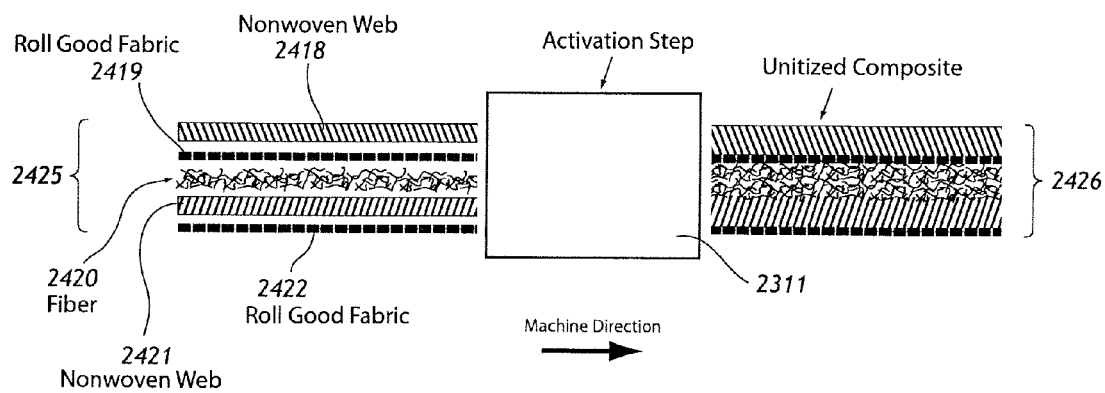

FIG. 18B shows an assembly 2425 of a loose fiber layer 2420, with nonwoven process layers 2418, 2421 all laid down at the same time on a previously made roll good fabric 2422, and incorporating an interior layer of previously made roll good fabric 2419, and subsequently bonded in an oven or other activation step 2311 into a single unitized composite 2426.

Figure 19:
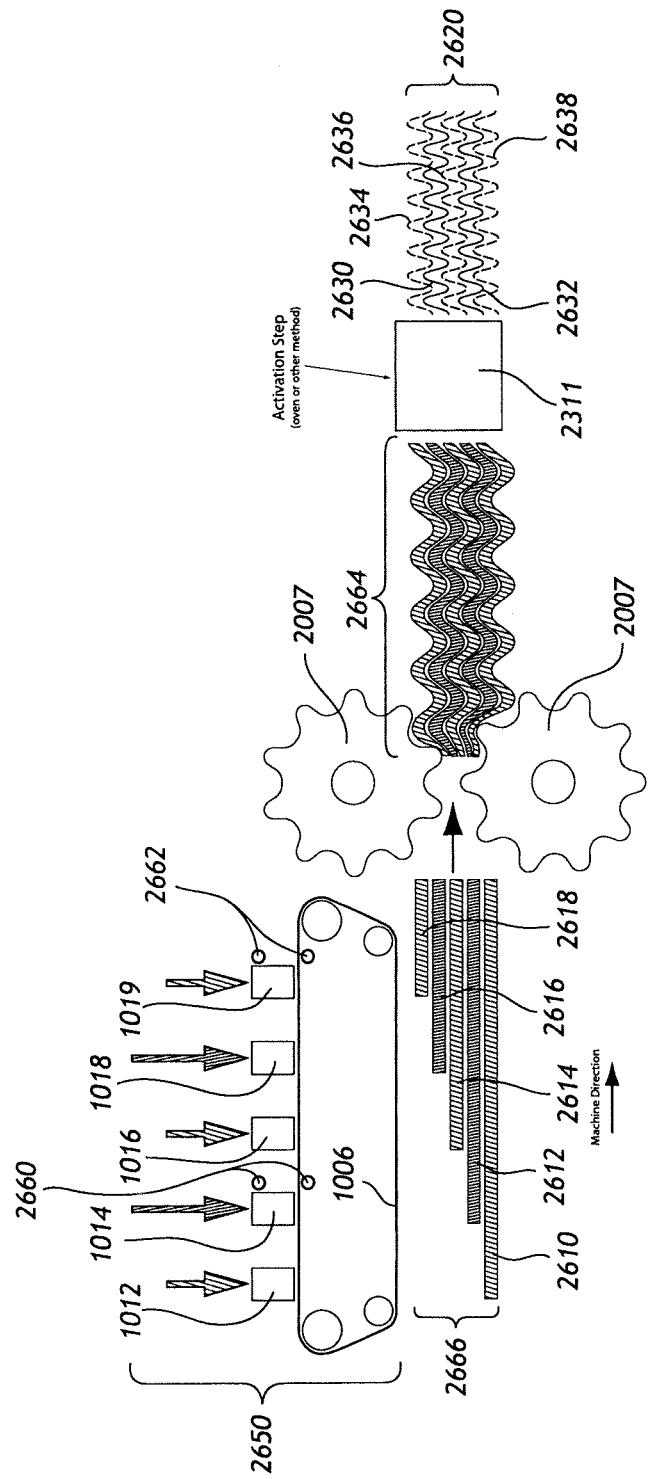
FIG. 19 shows an airlaid process for assembling loose-fiber layered elements with the overall assembly shaped into a wave-like form followed by an activation step causing the elements to bond and to remain in a wave-like shaping.

FIG. 19 shows an exemplary method for airlaid forming of loose fiber assemblies of elements 2610, 2612, 2614, 2616 and 2618 using airlaid former 2650 with the overall assembly shaped into a wave-like form using corrugation rolls 2007 followed by an oven 2311 or other activation step, causing the elements to bond together into a unitized composite 2620 with a wave-like shaping. Such a shaping method, while feasible, requires changing of the corrugating roll when wave amplitude and wavelength or wavenumber changes are desired, with a resulting loss of manufacturing efficiency and increase in expense.

Figure 20:
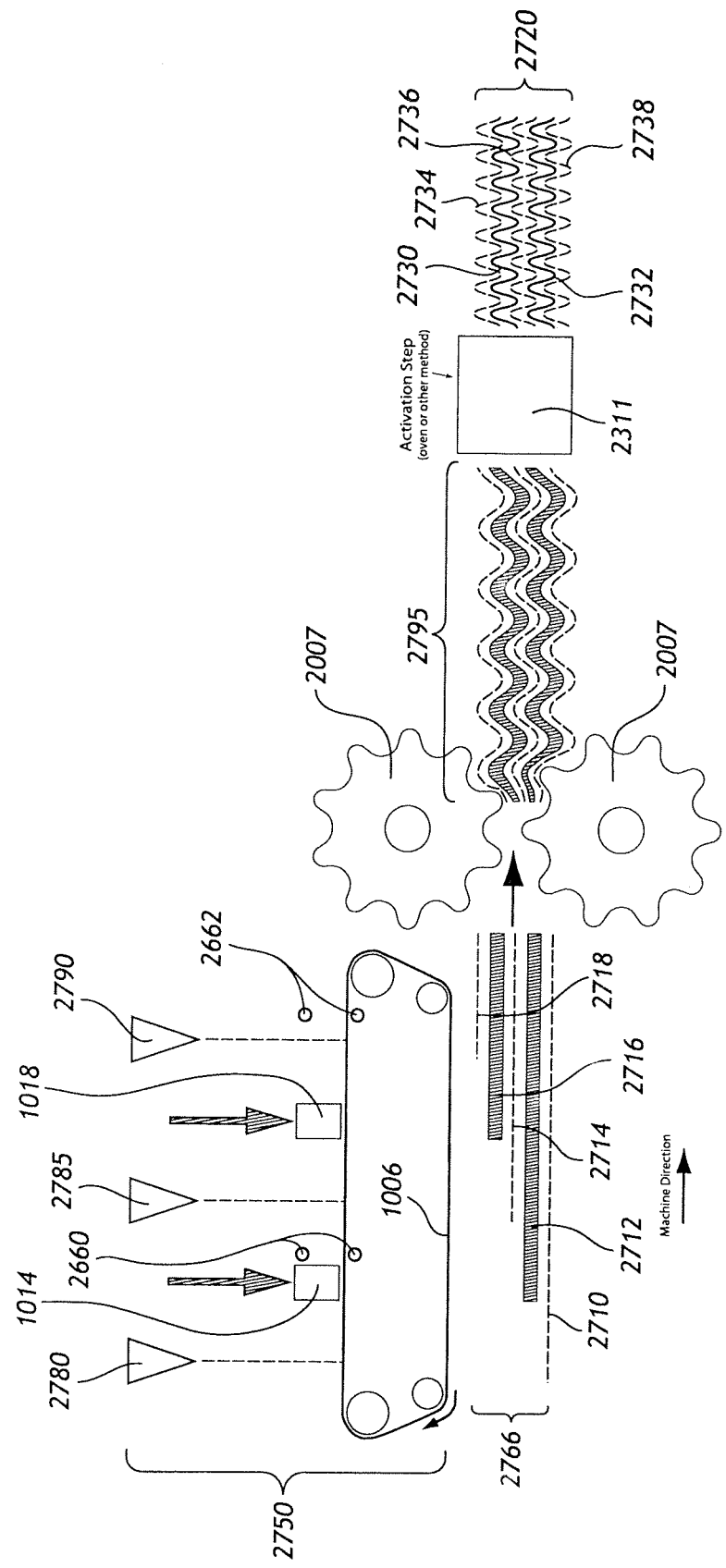
FIG. 20 shows an airlaid process assembling loose fibers and nonwovens elements with the assembly shaped into a wave-like form followed by activation.

FIG. 20 shows an exemplary airlaid forming method depositing loose fibers 2712, 2716 using airlaid former 2750 and also depositing direct process nonwovens elements 2710, 2714, 2718, with the overall assembly of layers being formed into a wave-like structure using corrugation rolls 2007 followed by an oven or activation stage 2311 causing the elements to bond into a unitized composite 2720.

Figure 21:
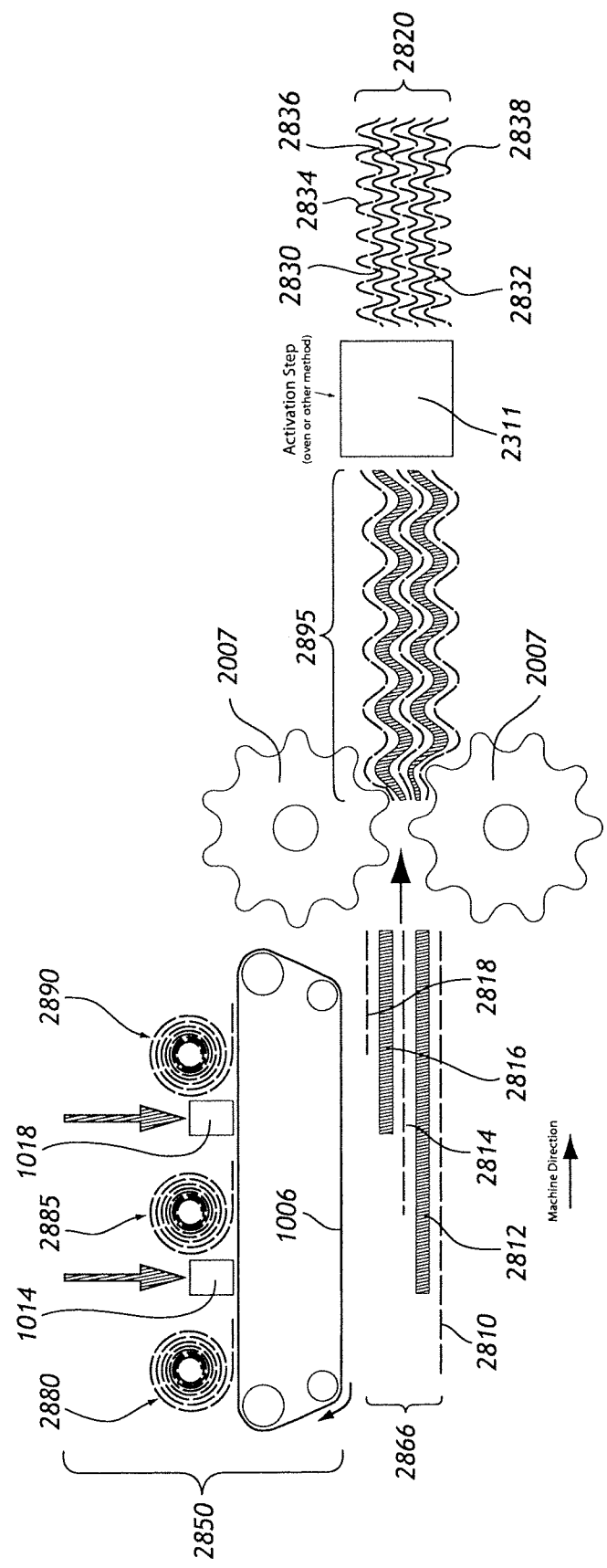
FIG. 21 shows another method of forming a wave-like unitized composite by depositing layers of loose fibers combined during assembly with roll goods.

FIG. 21 shows another exemplary method for airlaid forming of loose assemblies of layers 2812, 2816 of loose fibers with previously made roll goods 2810, 2814, 2818 with the overall assembly being first formed into an wave-like shape using corrugation rolls 2007 followed by an oven or activation stage 2311, causing the elements to bond to each other, resulting in a bonded composite 2820.

Figure 22:
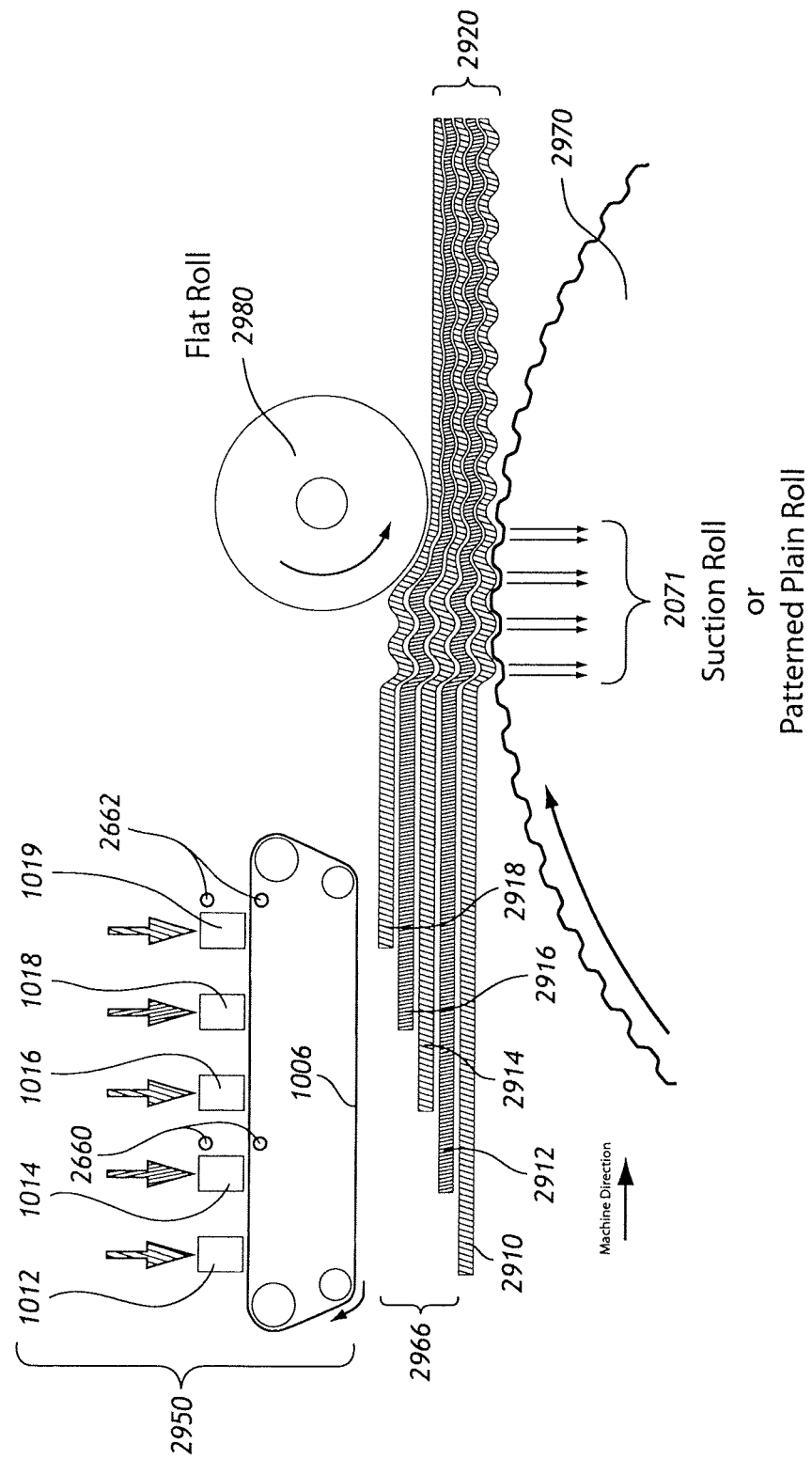
FIG. 22 shows a method of imparting a raised wave-like shaping to an assembly using a recessed patterned roll, optionally employing suction.

FIG. 22 shows a method of shaping an assembly 2966 of elements into a wave-like structure using a patterned roll 2970 with a recessed surface feature and a compression roll 2980 to form a three-dimensional shaping, optionally similar to that made by corrugation rolls. The patterned roll 2970 can optionally employ raised shaping features rather than recessed shaping features and can optionally employ suction 2071 to further enhance the patterning imparted to the assembly 2920.

FIG. 23 shows another method of shaping the assembly into a wave-like, relatively distinctly folded structure using conventional pleating techniques 3030 to form three-dimensional wave-like shapes 3020 generally similar to wave-like structures which can be made by corrugation rolls.

FIG. 24A shows another method for manufacturing an irregular three-dimensional raised structure, made by using creping techniques such as those used in the production of tissue papers. An assembly 3166 is adhered to a drier 3172 using a pressure roll 3170. A creping blade 3154 causes the web to buckle into a three-dimensional wave-like shape 3160, followed by a slower moving take-up roll 3155, which preserves the three-dimensional shaping of the creped assembly.

FIGS. 24B-C show other methods of imparting a three-dimensional raised structure 3198 by using Micrex® micro-creping processes used in the paper and nonwovens industries for imparting z direction wave-like shaping and softness to fabric assemblies. Generally, Micrex® micro-creping and other similar processes depend on different speeds of the web between two or more moving or stationary surfaces, such as rolls or belts, where the incoming fabric 3199 moves faster than the takeup winder 3155, which at least partially preserves the three-dimensional shaping of the assembly after activation.

The known techniques for shaping an assembly into wave-like forms as described in FIGS. 19-24C are limited in their ability to easily alter the amplitude and wavenumber or wavelength of desired wave-like shapings imparted to assemblies, especially for very fragile assemblies and light weight, low density assemblies of relatively short fiber assemblies with little cohesion or entanglement between the fibers. Further, manipulation of the amplitude and wavenumber or wavelengths desired, using such processes, can be limited by the fragile physical properties of such assemblies and may cause undesirable stiffness reductions and loss of tensile strength. Further, the machinery adjustments required to make changes to the amplitude and wavenumber or wavelengths are often complicated.

The practice of the present invention avoids such limitations by exploiting the proven benefits of the short fiber airlaid process equipment's assembly transfer device, as normally used in flat roll goods production, to deliver a fragile assembly of loose fibers—intact—onto the oven wire which follows prior to bonding. By substantially deviating from the typical software and machinery conditions normally used to produce fragile, relatively flat assemblies and unitized composites, the ability of the transfer device to handle very fragile short fiber assemblies while also imparting raised, wave-like shaping to the assembly without disruption of the fragile assembly can be exploited.

FIGS. 25A-D illustrate practice of one preferred method according to the present invention for shaping the airlaid layered assembly prior to the activation step, using a raised transport wire device such as is offered for sale by DanWeb A/S of Aarhus, Denmark. The transfer device functions by employing a suction box 3264 to provide vacuum through a moving porous wire belt 3210 closely synchronized in speed to both the oven wire 3259 and the forming wire 1006. The function of the transfer device in normal operation is to lift the fragile loose fiber assembly from the forming section wire and then deposit the assembly—intact—onto the oven wire where subsequent activation and bonding will occur.

In normal conventionally known operation of the airlaying technique employing a transfer device, the transfer device wire 3210 is raised only very slightly above the plane of the oven wire 3259 to a height approximately equal to the thickness of the loose fiber assembly, and both the transfer wire and oven wire travel at very similar relative speeds, producing a relatively flat unitized composite fabric typical of industry practice after activation and bonding in an oven or other activation device.

According to one aspect of the present invention, by optionally raising the height of the transfer device wire 3210 substantially higher in the z-direction compared to the oven wire 3259, and by substantially slowing down the speed of the oven wire relative to the transfer device wire, the material in the assembly is caused to pile up into a repeating wave-like shaping. A further benefit of this technique is immediate and simple machinery software setting adjustments to produce the desired amplitude and wavenumber imparted to the assembly by adjusting the transfer height and/or the speed of the transfer device relative to the oven wire speed using the machine control software settings.

FIG. 25A shows a preferred exemplary method of forming a unitized composite made by depositing loose assemblies of layers 3216, with the overall assembly being formed into a wave-like structure 3226 using a transfer wire 3210 raised in the z-direction relative to the plane of the oven wire 3259, which is moving at a lower speed than the transfer wire 3210 to impart three-dimensional wave-like shaping of the desired amplitude to the assembly of elements.

Figure 25B:
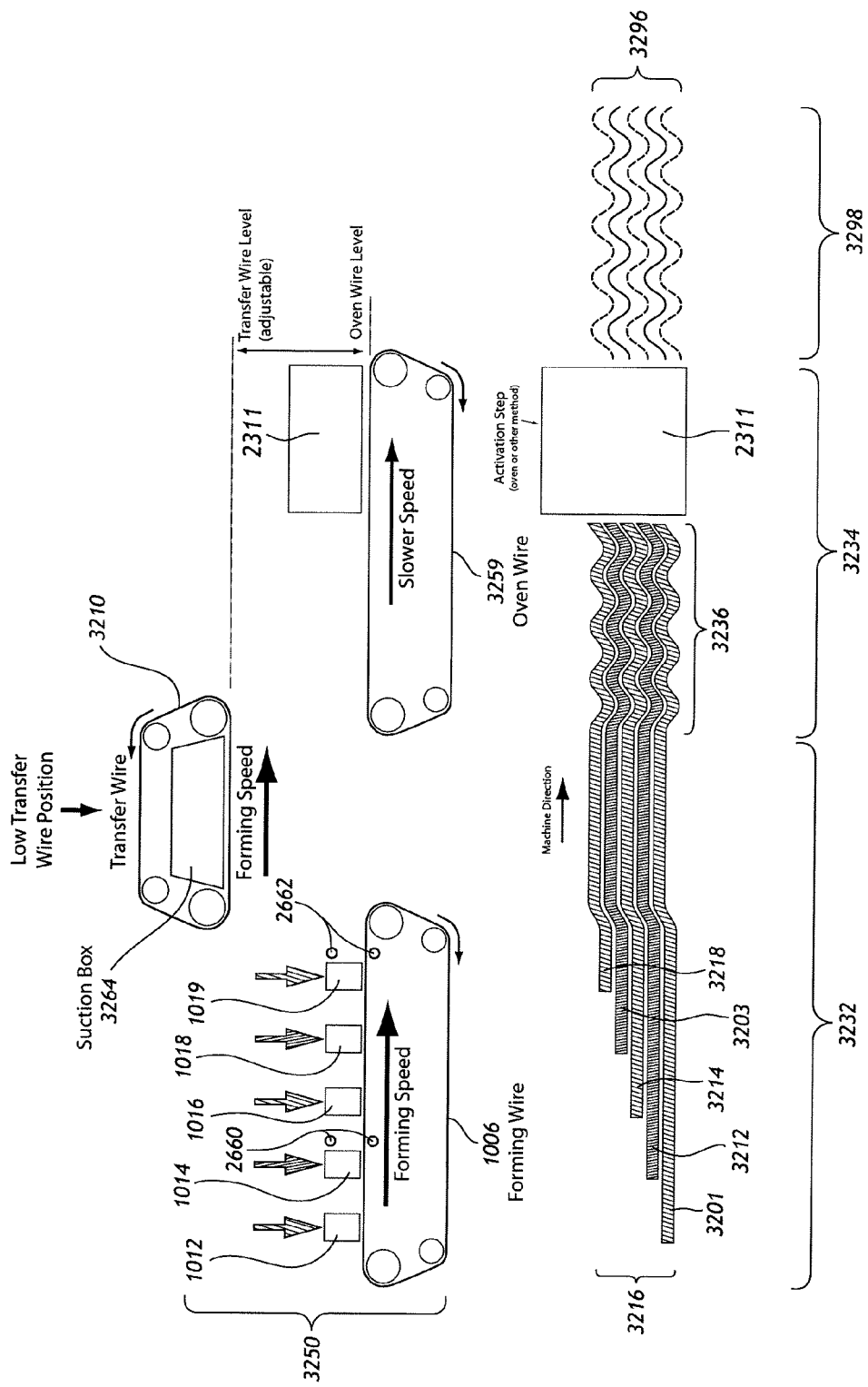

FIG. 25B shows an exemplary method of forming a unitized composite made by depositing loose fiber assemblies, with the overall assembly being formed into a wave-like structure 3236 of lower amplitude compared to 3226 of FIG. 25A, using a transfer wire 3210 which is raised relatively less in the z direction compared to FIG. 25A.

Figure 25C:
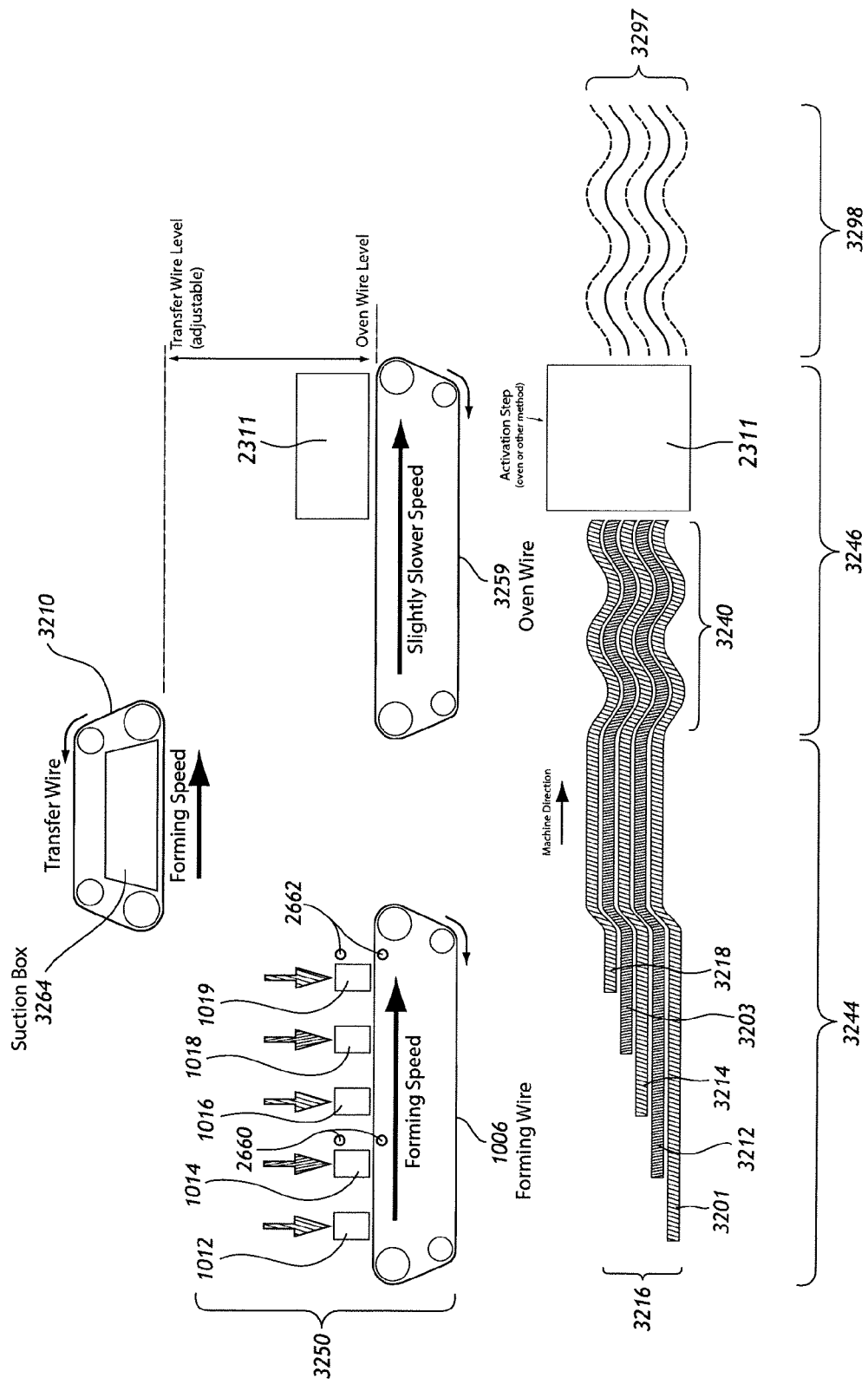

FIG. 25C shows an exemplary method of forming a unitized composite made by depositing loose fiber assemblies, with the overall assembly being formed into a wave-like structure 3240 of lower wavenumber compared to 3226 of FIG. 25A, using an oven wire 3259 which is moving faster than the oven wire 3259 in FIG. 25A, while still moving slower than the transfer wire 3210.

Figure 25D:
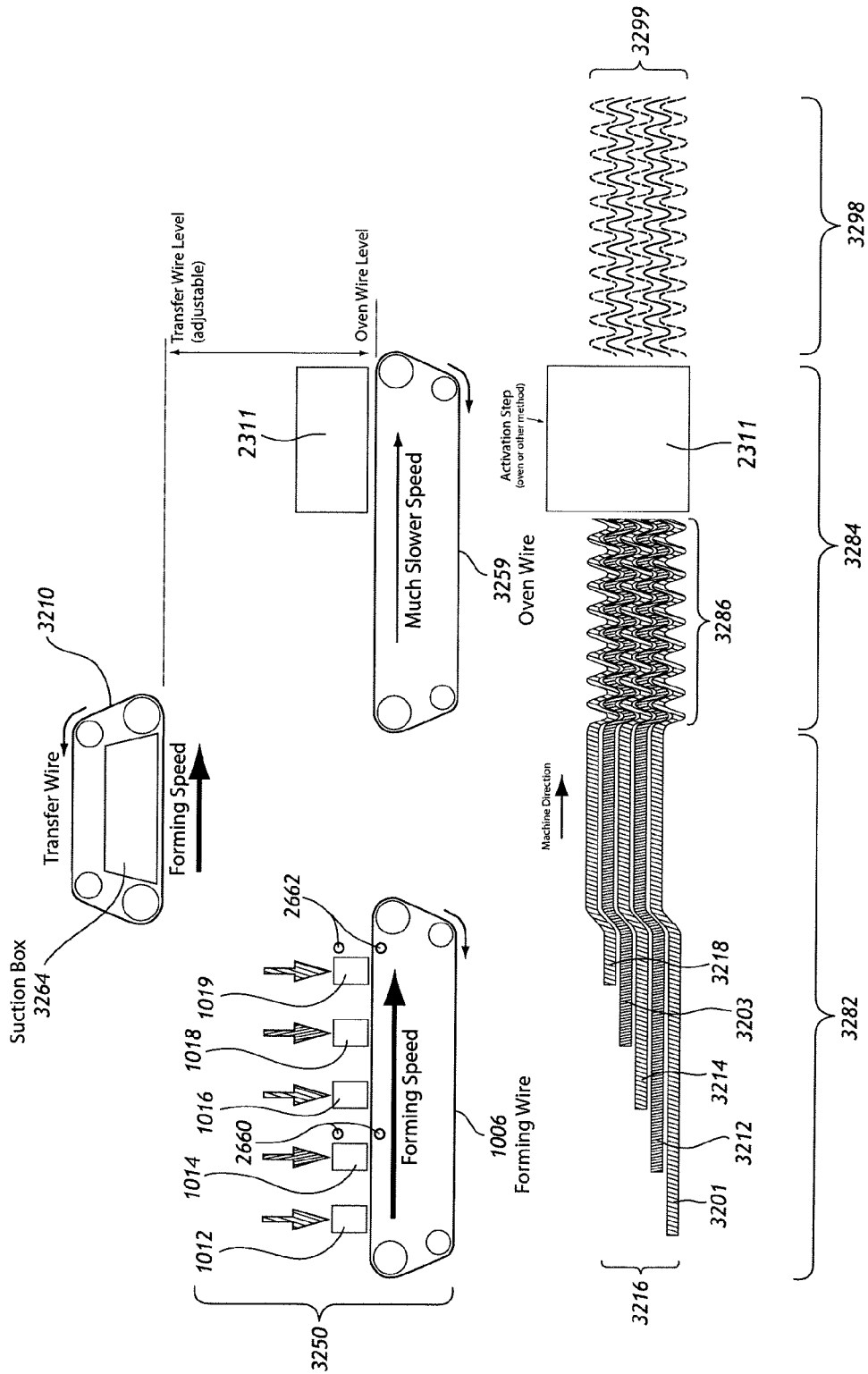

FIG. 25D shows an exemplary method of forming a unitized composite made by depositing loose fiber assemblies, with the overall assembly being formed into a wave-like structure 3286 of higher wavenumber compared to 3226 of FIG. 25A, using an oven wire 3259 which is moving slower than the oven wire 3259 in FIG. 25A.

Practitioners skilled in the art can appreciate that the overall shape of the wave, as well as the amplitude and wavenumber of wave-like shaping, can be adjusted over a wide range and can operate successfully on assemblies which vary widely in thickness and basis weights by employing variations in both the raised height of the transfer device and the relative speed of the transfer wire versus the oven wire. It is generally desired in commercial production to maximize the mass of deposited assemblies delivered from the deposition devices (forming heads) for maximized production at any desired basis weight of an assembly.

Further, it can be appreciated that for any given mass amount of an assembly supplied at a constant speed and constant mass to the transfer device, and with constant speeds of the transfer device relative to the oven wire, the amplitude and wavenumber or wavelengths of waves produced are related in a predictable fashion. For example, if the transfer height is increased, the amplitude will increase and the wavenumber of the waves will be reduced accordingly, if no other changes are made. Similarly, if the transfer height is reduced, the wavenumber of waves produced will increase to accommodate the mass being delivered by the incoming assembly to the transfer device. Therefore, one desirable aspect of the present invention employing the raised transfer device technique is the ability to change both the amplitude and the wavenumber or wavelengths of waves imparted to the assembly to the desired combination by changing both the height of the transfer device wire relative to the oven wire and also by independently changing the relative speed of the transfer device wire relative to the oven wire.

For example, referring to FIG. 25A, for any particular constant mass of an assembly 3216 delivered to the transfer device 3210, if a high amplitude wave-like shaping is desired in combination with a high wavenumber, the speed of the oven wire 3259 relative to the transfer device wire 3210 must also be decreased so that sufficient assembly material is available to produce both high amplitude and high wavenumber without disrupting the assembly delivered to the activation step. Similarly, if a low amplitude wave-like shaping is desired in combination with a low wavenumber, the speed of the oven wire 3259 relative to the transfer device wire 3210 must also be increased so that sufficient assembly material is accommodated to produce the low amplitude and low wavenumber without disrupting the assembly delivered to the activation step.

Another attribute of certain embodiments of the present invention is of special advantage when very high-basis-weight unitized composites are required. In normal operation, the short fiber airlaid process limitations for production of very high basis weight composites become problematic to manufacture efficiently because the process depends on having sufficient vacuum available to condense and deposit the fibers out of the air used to transport the fibers to the forming heads. As more and more fiber deposition is required, eventually the amount of effectively available vacuum becomes insufficient, limiting the total achievable basis weight and limiting desired high throughput of all available forming heads. The present invention overcomes such limitations because the wave shaping process can greatly increase the basis weight and optionally the thickness of the unitized composite without requiring large amounts of air to be pulled through such an assembly. Therefore, higher final basis weights can be achieved while running the forming heads at optimum throughputs.

Another attribute of the present invention contemplates manufacture of relatively extensible elastic and also inelastic unitized composites by exploiting variations in the recipes used in the assemblies and the degree of bonding between individual waves in an activated assembly. The present invention contemplates variations in the degree to which individual waves in the unitized composite optionally bond to each other as a method to optionally produce extensible fabric with some elasticity in the unitized composite in the machine direction. Practitioners skilled in the art can appreciate that individual waves in a unitized composite, after activation, can be easily and substantially stretched with the application of a tensile force provided that the individual waves do not substantially bond to each other or provided that such bonds between waves can be broken after activation by a suitable process, such as controlled stretching. Such treated fabrics will elongate substantially in the MD direction when exposed to a tensile force and can be made to recover when the tensile force is removed.

Figure 46:
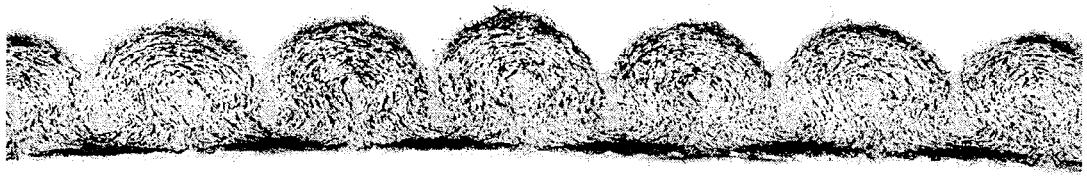
Figure 47:
Figure 48:

FIG. 46 shows a photomicrograph of a unitized composite made according to the conditions shown in sample 18 in Table 1. A 7 cm by 2.6 cm strip of sample 18 unitized composite, oriented in the machine direction, was subjected to a tensile force of 0.85 kg, causing the bonded waves to become separated. Subsequent application of tensile force causes substantial elongation followed by recovery when the force is removed. FIG. 47 shows such a stretched sample, and FIG. 48 shows the sample after recovery when the force has been removed.

Figure 26B:
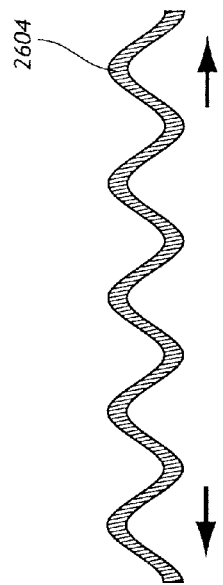
FIG. 26B shows application of tensile force to the unitized composite of FIG. 26A and the resulting elastic behavior.
Figure 26D:
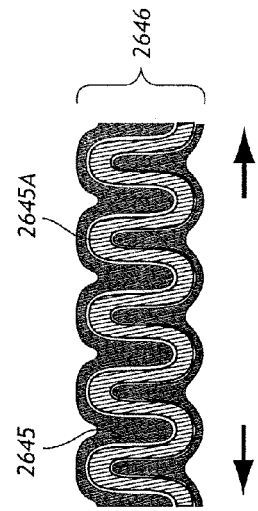
FIG. 26D shows application of tensile force to the unitized composite of FIG. 26C and the resulting inelastic behavior.
Figure 26A:
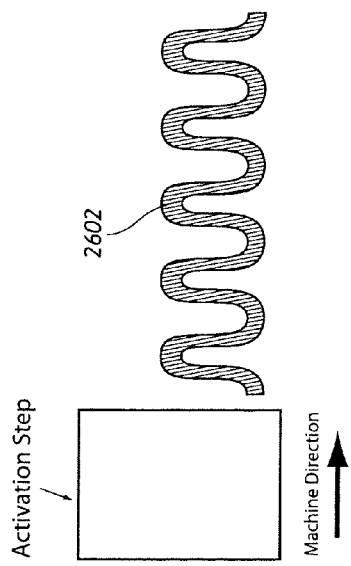
FIG. 26A shows a wave-like unitized composite which is extensible and elastic in the machine direction.

FIG. 26A shows an assembly 2602 where individual waves are not substantially bonded to each other after activation. FIG. 26B shows the resulting elongation 2604 and general elastic behavior when tensile force is applied to the unitized composite 2602.

Figure 26C:
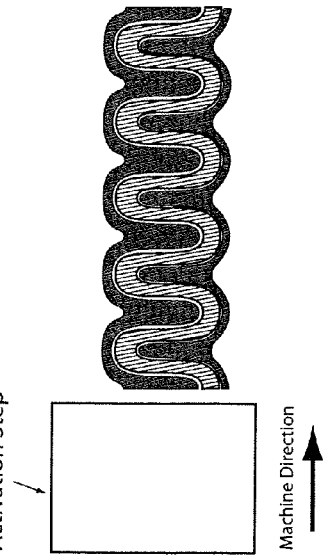
FIG. 26C shows a unitized composite with waves adhered to each other.

FIG. 26C shows an assembly 2640 where the individual waves are substantially bonded to each other 2645 after activation.

FIG. 26D shows the inelastic behavior of a unitized composite 2646 when tensile force is applied, as compared to the elastic behavior of 2604 in FIG. 26B when the same tensile force is applied.

Figure 26E:
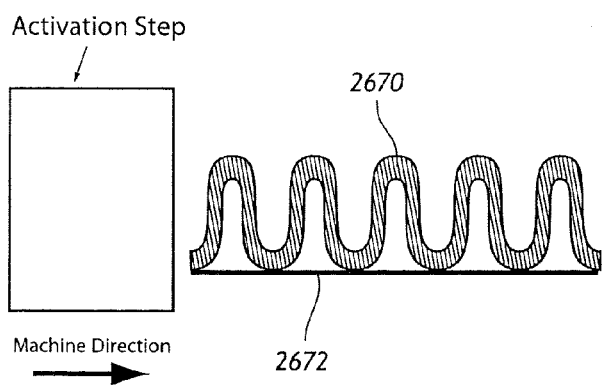
FIG. 26E shows a unitized composite where a film, extrusion, or other roll good is adhered to the bottom of a wave-like unitized composite.
Figure 26F:
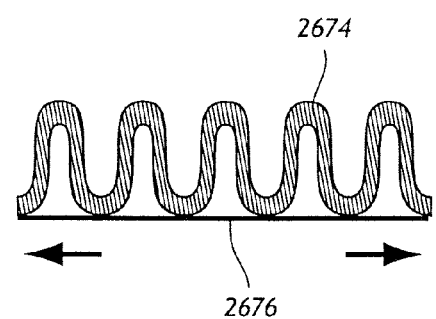
FIG. 26F shows a unitized composite where a film, extrusion, or other roll good is adhered to the bottom of a wave-like unitized composite, with the resulting relatively inelastic behavior.

FIG. 26E shows a unitized composite 2670 where a film 2672, extrusion, or other roll good is adhered to the bottom of a wave-like unitized composite after activation, with resulting relatively inelastic behavior of 2674 in FIG. 26F as compared to the elastic behavior of 2604 in FIG. 26B when the same tensile force is applied. It is contemplated that the film, extrusion or roll good can be adhered to either the bottom surface, top surface or both surfaces.

Another embodiment of the present invention contemplates treatment of the shaped wave-like assembly prior to or after activation by mechanical processes, such as hydro-entangling or by needling, to produce novel structures with unusual surfaces, textures and physical properties in the unitized composites.

Another embodiment of the present invention contemplates the addition of particles into the unitized composites. Introduction of a wide variety of particles and other materials—either into the individual layers, between the individual layers, or on top of the shaped assembly—is also contemplated as being of special advantage in certain applications.

Figure 27A:
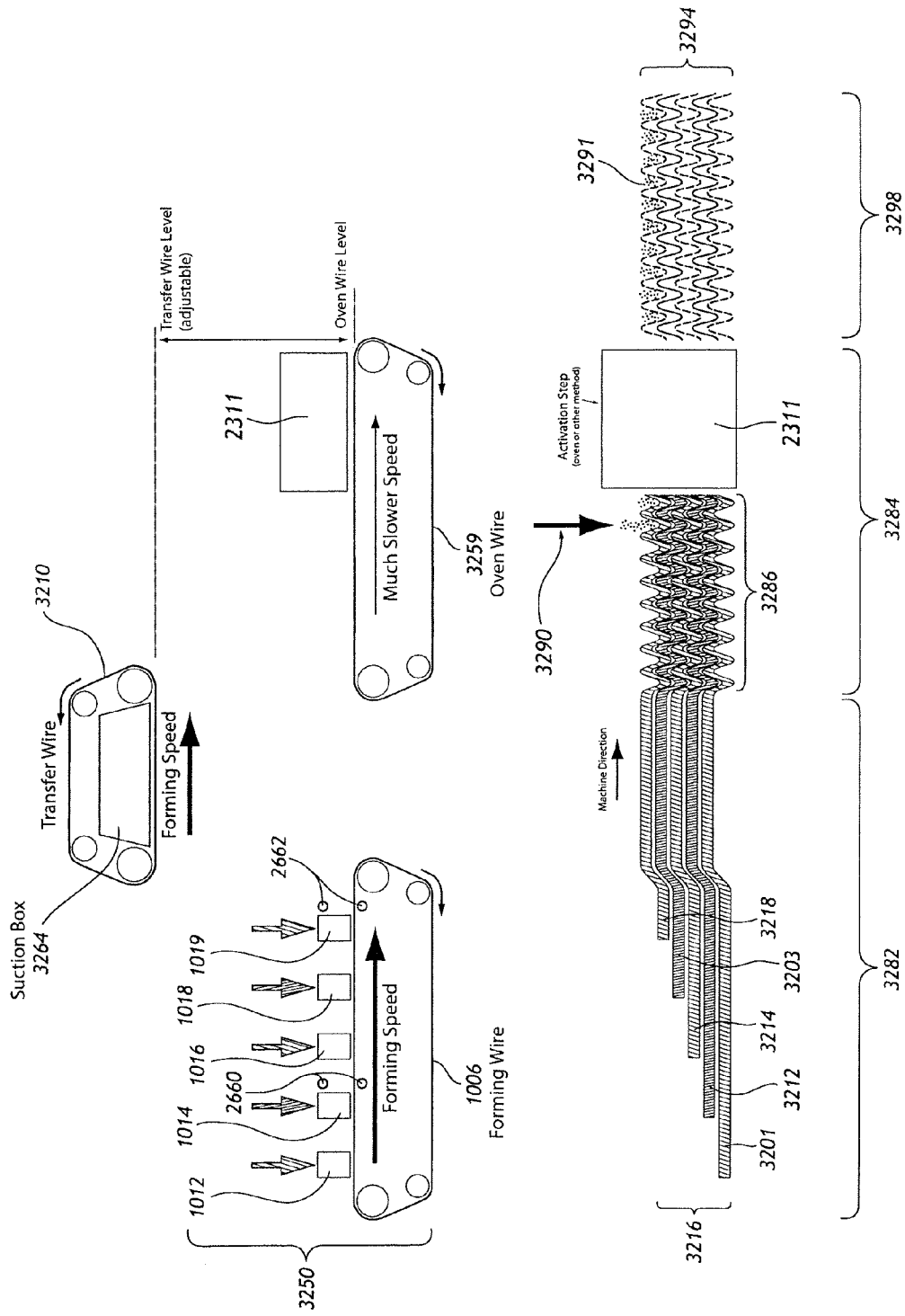
FIGS. 27A and 27B show addition of particles to a shaped assembly before activation, and the locations of the particles after activation, respectively.

FIG. 27A shows one exemplary addition of particles 3290 to the top of the shaped assembly 3286 prior to activation and the general particle locations after activation 3291. Skilled practitioners will recognize that many types and forms of particles, in many combinations, can be added without departing from the spirit of this invention. Indeed, careful selection of the placement of particles in multiple locations within the interior of the unitized composite's various layers is specifically contemplated as offering advantages in the effective use of the functionality provided by the particles. Functional coatings such as emulsion polymers, etc. can also be applied.

Figure 27B:
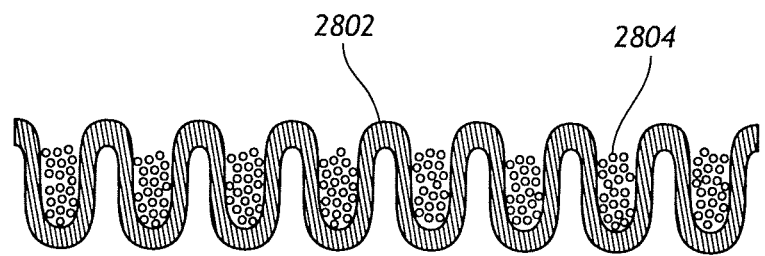
Figure 28:
FIGS. 28-48 show optical micrographs of exemplary unitized composites.
Figure 29:
Figure 30:
Figure 31:
Figure 32:
Figure 33:
Figure 34:
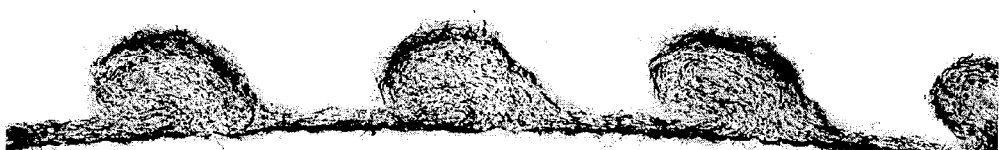
Figure 35:
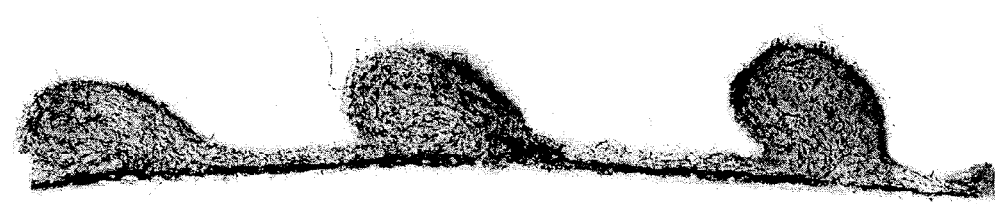
Figure 36:
Figure 37:
Figure 38:
Figure 39:
Figure 40:
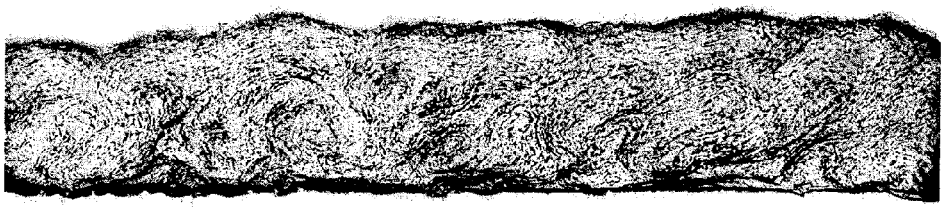
Figure 41:
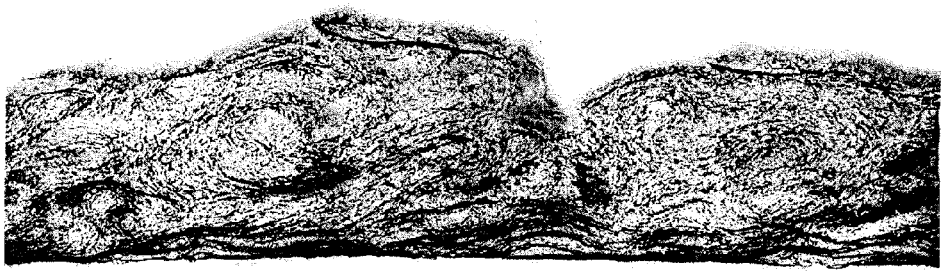
Figure 42:
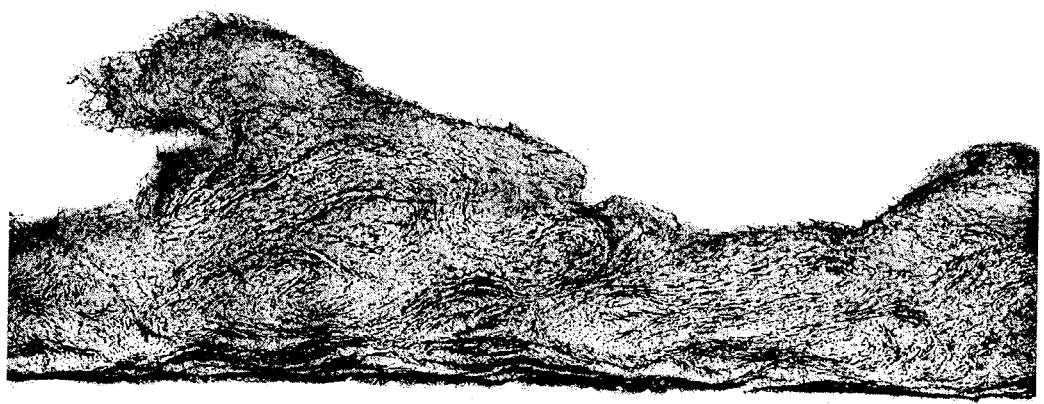
Figure 43:
Figure 44:
Figure 45:

Practitioners will also appreciate that because of gravity and the optional use of a suction device below the particle application device, a uniform application of particles to a wave-like assembly 2802 will tend to cause the particles to concentrate in the lower areas 2804 of the wave-like shapes, as depicted in FIG. 27B. FIG. 45 shows an exemplary optical micrograph.

The exemplary embodiments of the present invention are described in Table 1, demonstrating assembly element recipes and machinery settings appropriate to exemplary practice of the present invention. Exemplary embodiments are made with non-limiting reference to airlaying deposition of loose fiber assemblies using a typical through dryer oven for activation and bonding of the assemblies, and using a z-direction raised transfer wire device moving relatively faster than the oven wire following it, as generally depicted in FIGS. 25A-D.

A suitable airlaid forming system for deposition of such loose fiber assemblies configured for manufacturing embodiments of the present invention is available for public use from Marketing Technology Service, Inc. of Kalamazoo Mich. USA and was employed to produce samples in Table 1, according to the recipes and using the specified machinery settings shown in Table 1.

FIGS. 30-48 are optical micrographs showing side views of the exemplary structures, magnified by 2× and 4×, demonstrating aspects of the present invention according to the examples described in Table 1.

The thermoplastic binder fibers used in the exemplary embodiments are typical bi-component bonding fibers available to the airlaid industry commercially, although many other fibers suitable for practice of the invention are available. Trevira T-255 grade of 1.55 denier is available for purchase from Trevira GmbH of Augeburg Germany. The length of the synthetic fiber was about six millimeters, although much longer and much shorter fibers are optionally selected for the practice of the present invention, and many types of fibers can be used as bonding fibers. The components useful for the practice of the present invention can be hydrophilic, hydrophobic or a combination of both hydrophilic and hydrophobic materials. Suitable fibers for use in the present invention include many cellulose fibers (such as wood pulp and cotton), modified cellulosic fibers (such as rayon and Lyocell), cellulose acetate, hemp, jute, flax, polyester, polypropylene, polyethylene, PLA and many other synthetic, mineral (e.g., glass), and natural materials which can be utilized alone or in blends with other nonfibrous materials. These components can also be blended together in a wide variety of recipes to achieve desired attributes.

Table 1 shows the grams per square meter of fibrous material deposited in the airlaid forming head during assembly, the compression roll conditions, the height of the raised transfer wire relative to the surface of the oven wire, and the speeds of the transfer wire and the oven wire. The formula and machinery conditions listed in Table 1 (including the raised transfer height and the relative speed of the transfer wire and oven wire) follow the teachings of an airlaid fibrous deposition configuration as generally illustrated in FIG. 25A. The oven temperatures used in the activation step were set to 140 degrees Centigrade for all examples shown in Table 1.

TABLE 1

| SAMPLE # | HEAD 1 GSM FIBER | COMPACTOR B SETTING | TRANSFER RAISED HEIGHT MM | SPEED TRANSFER M/MIN | M/MIN OVEN SPEED |
|---|---|---|---|---|---|
| 1 | 60 Trevira | No heat 0 Bar | 3.8 mm | 10 | 8.5 (−15%) |
| 2 | 60 Trevira | No heat 0 Bar | 1.8 mm | 10 | 8.5 (−15%) |
| 3 | 60 Trevira | No Heat 0 Bar | 1.8 mm | 10 | 7 (−30%) |
| 4 | 60 Trevira | No Heat 0 Bar | 12.8 mm | 10 | 7 (−30%) |
| 5 | 60 Trevira | No Heat 0 Bar | 9.3 mm | 10 | 7 (−30%) |
| 6 | 60 Trevira | No Heat 0 Bar | 5.8 mm | 10 | 5 (−50%) |
| 7 | 60 Trevira | No Heat 0 Bar | 9.3 mm | 10 | 5 (−50%) |
| 8 | 60 Trevira | No Heat 0 Bar | 12.8 mm | 10 | 5 (−50%) |
| 9 | 60 Trevira | No Heat 0 Bar | 9.3 mm | 10 | 2.5 (−75%) |
| 10 | 60 Trevira | No Heat 0 Bar | 12.8 mm | 10 | 2.5 (−75%) |
| 11 | 60 Trevira | No Heat | 3.8 mm | 10 | 2.5 (−75%) |

TABLE 1-continued

| SAMPLE # | HEAD 1 GSM FIBER | COMPACTOR B SETTING | TRANSFER RAISED HEIGHT MM | SPEED TRANSFER M/MIN | M/MIN OVEN SPEED |
|---|---|---|---|---|---|
| 12 | 60 Trevira | 0 Bar No Heat | 3.8 mm | 10 | 5 (−50%) |
| 13 | 60 Trevira | 0 Bar No Heat | 12.8 mm | 10 | 1 (−90%) |
| 14 | 60 Trevira | 0 Bar No Heat | 9.3 mm | 10 | 1 (−90%) |
| 15 | 60 Trevira | 0 Bar No Heat | 3.8 mm | 10 | 1 (−90%) |
| 16 | 60 Trevira | 0 Bar No Heat | 5.8 mm | 10 | 5 (−50%) |
| 17 | 60 Trevira | No Compaction No Heat | 3.8 mm | 10 | 7 (−30%) |
| 18 | 170 Trevira | 0 Bar No Heat | 11.8 mm | 4 | 2 (50%) |

Table 2 shows unitized composite final basis weights and densities achieved with the conditions listed in Table 1.

TABLE 2

| Sample # | Raised Transfer Height mm | Oven Speed % vs Transfer | Density g/cm³ | Basis Weight gsm |
|---|---|---|---|---|
| 1 | 3.8 | −15 | 0.03 | 72 |
| 17 | 3.8 | −30 | 0.02 | 95 |
| 12 | 3.8 | −50 | 0.04 | 128 |
| 11 | 3.8 | −75 | 0.04 | 254 |
| 15 | 3.8 | −90 | 0.05 | 652 |
| 5 | 9.3 | −30 | 0.01 | 94 |
| 7 | 9.3 | −50 | 0.02 | 128 |
| 9 | 9.3 | −75 | 0.03 | 221 |
| 14 | 9.3 | −90 | 0.05 | 636 |
| 4 | 12.8 | −30 | 0.01 | 83 |
| 8 | 12.8 | −50 | 0.02 | 149 |
| 10 | 12.8 | −75 | 0.03 | 250 |
| 13 | 12.8 | −90 | 0.04 | 620 |

The testing apparatus for evaluating the tensile strength and extensibility for the data in Table 3 is a Thwing-Albert QC-1000 tensile tester model, commonly used to evaluate tensile strength of paper and other fabrics. A T-A Load Cell Model: RSB-1 with a capacity of 2000 grams is used. During the test, the load cell is first zeroed, and the test is initiated by causing the traveling support to descend to the breaking point, or to a maximum of 20 cm, at a rate of 7 cm/minute. The tensile strength and elongation is measured during the test and recorded in Table 3.

Table 3 shows tensile breaking force and elongation measurements in both the MD and CD directions, as well as the final basis weight, final thickness and final overall densities of the exemplary low density unitized composites according to the recipes and conditions described in Table 1. The data show that the MD elongation of unitized composites following the invention are more extensible in the machine direction than in the CD direction and can be made relatively low or very high.

TABLE 3

| Sample # | Final Density g/cm² | Final Basis Weight (gsm) | MD Tensile Breaking Force (kg) | CD Tensile Breaking Force (kg) | Elongation % (MD) | Elongation % (CD) |
|---|---|---|---|---|---|---|
| 1 | 0.03 | 72 | 2.28 | 6.36 | 112 | 30 |
| 3 | 0.02 | 80 | 3.33 | 5.62 | 79 | 40 |
| 5 | 0.01 | 94 | 1.82 | 3.58 | 203 | 38 |
| 6 | 0.02 | 111 | 1.77 | 5.81 | 196 | 10 |
| 7 | 0.02 | 128 | 2.6 | 6.95 | 136 | 32 |
| 8 | 0.02 | 149 | 4.45 | 6.45 | 47 | 41 |
| 9 | 0.03 | 221 | 3.91 | 6.02 | 78 | 36 |
| 10 | 0.03 | 250 | 4.59 | 5.29 | 45 | 28 |
| 12 | 0.04 | 277 | — | — | — | — |
| 13 | 0.04 | 620 | 2.32 | 5.07 | 84 | 33 |
| 14 | 0.05 | 636 | 1.72 | 4.24 | 244 | 30 |
| 15 | 0.05 | 832 | 2.87 | 5.53 | 141 | 29 |

While some embodiments of the invention have been shown and described herein using the examples shown in Table 1, embodiments are provided by way of example only, in part because of the special flexibility of the present invention to easily produce an unusually wide variety of structures with numerous types of materials. Such flexibility ensures that other applications, variations, changes and substitutions will occur to those skilled in the art without departing from the spirit of the present invention.

The uses and benefits conferred by this invention are also applicable in many fields including, but not limited to, paper and nonwoven constructions, finished products for household consumer applications, absorbent media, building and construction materials, filtration media, automotive applications, fabrics for noise reduction and thermal insulation, cushioning materials for shipment of fragile items such as ripe fruits, decorative fabrics such as window coverings, structural composites of low density and high strength such as are required for aerospace applications, moldable substrates, specialty packaging, and many other finished and semi-finished fabric and composite applications. Indeed, the ability of the present invention to use a wide variety of expensive and inexpensive materials—including recycled material—to achieve lower density structures, as compared to relatively flat composites or laminates, without resorting to additional converting steps in manufacture is specifically envisioned as an advantage of the present invention.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A process for producing a composite material comprising shaping an assembly of three or more layers into a wave-like form, the assembly including at least one previously made roll good fabric layer and at least one layer of loose fibers, and activating the shaped assembly to cause bonding of the layers and creation of a unitized composite material, in which the roll good fabric layer is between other layers of the assembly.

2. The process of claim 1, where the roll good element is a meltblown, a spunbonded, a spunmelted, or a wet formed web.

3. A process for producing a composite material comprising shaping an assembly of three or more layers into a wave-like form, the assembly including at least one in situ produced nonwoven layer and at least one layer of loose fibers, and activating the shaped assembly to cause bonding of the layers and creation of a unitized composite material, in which a roll good fabric layer is between other layers of the assembly.

4. The process of claim 3, where the in situ produced nonwoven is a meltblown, a spunbonded, or a spunmelted web.

* * * * *